US012634762B2

(12) United States Patent
Rangineni et al.

(10) Patent No.: US 12,634,762 B2
(45) Date of Patent: May 19, 2026

(54) WIRELESS METHODS, DEVICES AND SYSTEMS HAVING OPERATING PARAMETER UPDATES VIA PERIODIC, BROADCAST MESSAGE

(71) Applicant: Cypress Semiconductor Corporation, San Jose, CA (US)

(72) Inventors: Balasubramanyam Rangineni, San Diego, CA (US); Manamohan Mysore, Ramona, CA (US); Victor Zhodzishsky, Potomac, MA (US); Yu-Chia Lin, Hsinchu (TW)

(73) Assignee: Infineon Technologies Americas Corp., El Segundo, CA (US)

( * ) Notice: Subject to any disclaimer, the term of this patent is extended or adjusted under 35 U.S.C. 154(b) by 559 days.

(21) Appl. No.: 18/169,599

(22) Filed: Feb. 15, 2023

(65) Prior Publication Data

US 2024/0276304 A1    Aug. 15, 2024

(51) Int. Cl.
*H04W 28/18*    (2009.01)
*H04W 48/10*    (2009.01)
*H04W 56/00*    (2009.01)

(52) U.S. Cl.
CPC ........... *H04W 28/18* (2013.01); *H04W 48/10* (2013.01); *H04W 56/001* (2013.01)

(58) Field of Classification Search
CPC ... H04W 28/18; H04W 48/10; H04W 56/001; H04W 56/003
See application file for complete search history.

(56) References Cited

U.S. PATENT DOCUMENTS

2022/0116870 A1*    4/2022    Cariou ................... H04W 76/15
2024/0267960 A1*    8/2024    Cheong ................... H04W 4/80

* cited by examiner

*Primary Examiner* — Ayodeji O Ayotunde

(57) ABSTRACT

A method can include, by operation of a wireless device, monitoring at least a first advertising channel for an advertising packet; in response to advertising data in the advertising packet, synchronizing transmission and reception of packets to an advertising link that includes sub-intervals within a repeating interval on a second advertising channel. During a download sub-interval of the sub-intervals, and update packet can be received that includes new parameter data. During an upload sub-interval of the sub-intervals, transmitting an update response packet indicating the new parameter data has been received. Wireless operations of the wireless device can be configured according to the new parameter data. Communications can continue with the same advertising link while operating according to the new parameter data. Corresponding devices and systems are also disclosed.

19 Claims, 18 Drawing Sheets

1790

CONFIGURE FOR OPERATIONS
ACROSS MULTIPLE CHANNELS
WITH CURRENT CHANNEL MAP
1790-0

SYNCHRONIZE WITH ADVERTISING LINK WITH
REPEATING INTERVAL HAVING SUB-INTERVALS
1790-1

MONITOR QUALITY OF CHANNELS
1790-2

SCAN DL SUB-INTERVAL(s)
1790-3

RX
CHANNEL QUALITY REQ?
1790-4

N

Y

TRANSMIT CHANNEL QUALITY DATA IN UL SUB-INTERVAL
1790-5

RX
UPDATE CHANNEL MAP?
1790-6

N

Y

UPDATE CURRENT CHANNEL MAP
1790-7

WIRELESS METHODS, DEVICES AND SYSTEMS HAVING OPERATING PARAMETER UPDATES VIA PERIODIC, BROADCAST MESSAGE

TECHNICAL FIELD

The present disclosure relates generally to wireless devices and systems, and more particularly to wireless devices and systems that include periodic, broadcast (e.g., advertising) messaging.

BACKGROUND

Many wireless systems can include a broadcasting feature to transmit on a designated channel to multiple other devices. For example, Bluetooth low energy (BLE) can include periodic advertising broadcast as a logical transport for sending broadcast control and user data to all scanning devices in a given area. Such a broadcast can include a periodic, one-way transmissions to which scanning devices can be synchronized. Once synchronized, scanning devices can monitor designated time periods for broadcast packets. Alternate advertising approaches have been proposed, in which a central device can broadcast to many devices, with an option for those devices to respond back.

A typical BLE application utilizing periodic advertising can establish the timing and data for its broadcast by transmitting on a predetermined primary advertising channel to identify a secondary advertising channel. A secondary advertising channel can provide synchronization information that can enable scanning devices to time reception periods to a repeating advertising interval, in which the desired broadcast data can be transmitted. In the event changes to the transmission parameters are needed (e.g., a change in the advertising interval or a change to the physical layer), the BLE application will disable the advertising link, and then re-configure the periodic advertising with the new parameters as needed. As a result, applications that update parameters in a BLE periodic advertising system must accommodate the time and power necessary for the reconnecting required when re-establishing the periodic advertisement.

One application for BLE periodic advertising can be the distribution of a channel map. A channel map can indicate which channels are to be used for transmissions. Conventionally, channel map data can be included in a synchronized advertising packet (i.e., AUX_SYNC_IND) in an additional data field (i.e., ACAD). While such a feature can provide a reliable method for distributing a channel map, it may only be suitable for a network of limited size, as the advertising device can only sense the channel quality of its local environment.

BRIEF DESCRIPTION OF THE DRAWINGS

FIGS. 12B-0 and 12B-1 are diagrams showing operations of a multi-level network according to an embodiment.

FIGS. 12C-0 and 12C-1 are diagrams showing operations of a multi-level network according to another embodiment.

DETAILED DESCRIPTION

Figure 1:
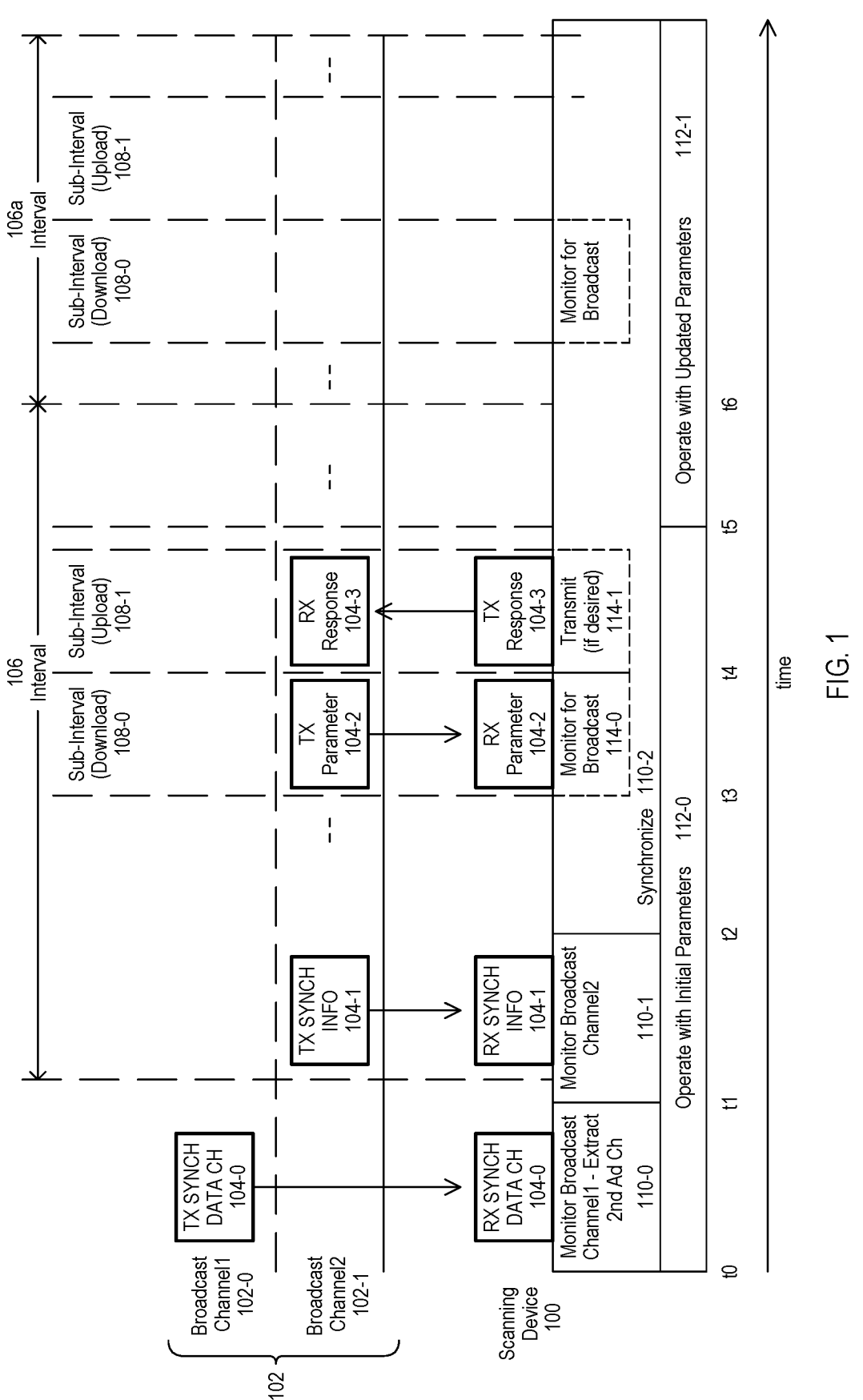
FIG. 1 is a timing diagram showing operations of devices according to embodiments.

According to embodiments, a broadcasting (e.g., advertising) device can create a periodic advertising link having a repeating interval with sub-intervals. The broadcasting device can transmit updated operating parameters for the link in download sub-intervals. A scanning device can download the updated operating parameters, alter its operations accordingly. The broadcasting device and scanning device(s) can then continue to communicate via the advertising link without having to re-establish the link.

Operating parameters can include any data for establishing the link or communication with the link, including but not limited to: timing information for the interval (e.g., interval duration, interval start with respect to a timing point); sub-interval timing (e.g., the number of sub-intervals, sub-interval start with respect to a timing point, sub-interval duration); a type of wireless physical (PHY) connection; packet error correction or detection data; a timing clock value for synchronizing to the interval and sub-intervals (e.g., clock accuracy); and authentication data.

According to embodiments, a scanning device can request new parameter data via an upload sub-interval of an advertising link. In response, a broadcasting device can transmit updated parameters in a download sub-interval of the advertising link.

According to embodiments, a broadcasting device can transmit a parameter request packet in a download sub-interval. In response, a scanning device can transmit its own parameter data in an upload sub-interval. In response, an advertising device can generate and then transmit the updated parameter data.

According to embodiments, a system can include a multi-layered network with layers communicating via advertising links having a repeating interval with sub-intervals. Wireless devices of a lower level can acquire data on their operating environment and transmit such data during upload sub-intervals. Wireless devices of an intermediate level can receive operating environment data for multiple devices and generate combined operating environment data which can be transmitted during upload sub-intervals. A higher level wireless device can receive the combined operating environment, and in response, generate new operating parameters. Such new operating parameters can then be transmitted to lower level wireless devices.

In some embodiments, operating environment data can include channel quality data, and operating parameters can include a channel map.

In some embodiments, wireless devices can operate according to one or more Bluetooth (BT) standards, including Bluetooth Low Energy (BLE). A periodic advertiser according can update advertising link parameters without re-establishing the link. BT methods can include, but are not limited to, LE periodic advertising broadcast (PADVB) and/or periodic advertising with responses (PAwR). BT link parameters that can be changed by the parameter update procedures according to embodiments include but are not limited to: (1) advertising interval, (2) PADV event timing and/or alignment, (3) physical layer, (4) CRC initialization, (5) channel map, (6) sleep clock accuracy or (7) additional authentication data.

In this way, a PADVB or PAwR periodic advertiser, acting upon an upper layer device request and/or local controller initiation, can update link parameters without re-establishing the link. In a PAwR system, new parameter information can be requested by scanning devices that are synchronized to a periodic advertiser. The periodic advertiser can integrate received parameter update requests to generate updated link parameters.

FIG. 1 is a timing diagram showing operations of devices according to embodiments. FIG. 1 shows operations of a scanning device 100 interacting with a periodic advertising link on one or more broadcast (advertising) channels 102 created by an advertising device (not shown).

At time t0, a scanning device 100 can monitor (e.g., scan) a predetermined advertising channel for broadcast messages 110-0 according to a predetermined standard. Advertising channel 102-0 can be a channel predetermined to include broadcast messages (e.g., according to a standard or by mutual agreement between devices). A scanning device 100 can detect and process a first type advertising packet 104-0. In the embodiment shown, a first type advertising packet 104-0 can include information identifying a second advertising channel 102-1. In response, a scanning device 100 can scan a second advertising channel 102-1. At this time, scanning device 100 can be operating according to initial parameters 112-0. In some embodiments, initial parameters can include parameters that control or relate to wireless communications, including communicating with the repeating advertising link.

At time t1, a scanning device 100 can scan a second broadcast channel 110-1 to detect and process a second type advertising packet 104-1. A second type advertising packet 104-1 can include synchronization information for a periodic advertising link. Such information can indicate the timing for repeating intervals 106, as well as sub-intervals within the interval 106. Intervals 106 can repeat with respect to a reference timing point included with second type advertising packet 104-1 or otherwise established by the predetermined standard.

At time t2, a scanning device 100 can use synchronization information to synchronize itself 110-2 with the repeating advertising link interval 106. Synchronization information can indicate one or more sub-intervals to scan within an interval 106.

At time t3, a scanning device 100 can monitor a download sub-interval 108-0 (which may or may not be on channel 102-1) to detect and process a parameter packet 104-2. A parameter packet 104-2 can include updated operating parameters.

At time t4, a scanning device 100 can transmit a response packet 104-3 during an upload sub-interval 108-1 (which may or may not be on advertising channel 102-1). A response packet 104-3 can indicate that the parameter packet 104-2 has been received.

At time t5, a scanning device 100 can switch to operating with the updated parameters received in a parameter packet 104-2. In alternate embodiments, a scanning device 100 can transmit a response packet after updating its parameters or can switch to new operating parameters at a later point in time, such as a next interval or assigned sub-interval.

At time t6, a next advertising interval 106a can occur. A next advertising interval 106a can be the same as previous advertising interval 106 or may be different as a result of the updated parameters.

In this way, a scanning device can synchronize itself with a repeating advertising device to receive updated parameter data. The scanning device can update its operation according to the updated parameter data and continue communications via the link according to the updated parameters, and without an advertising device re-establishing the link. Updated parameter data can take the form of any of those described herein or equivalents.

Figure 2:
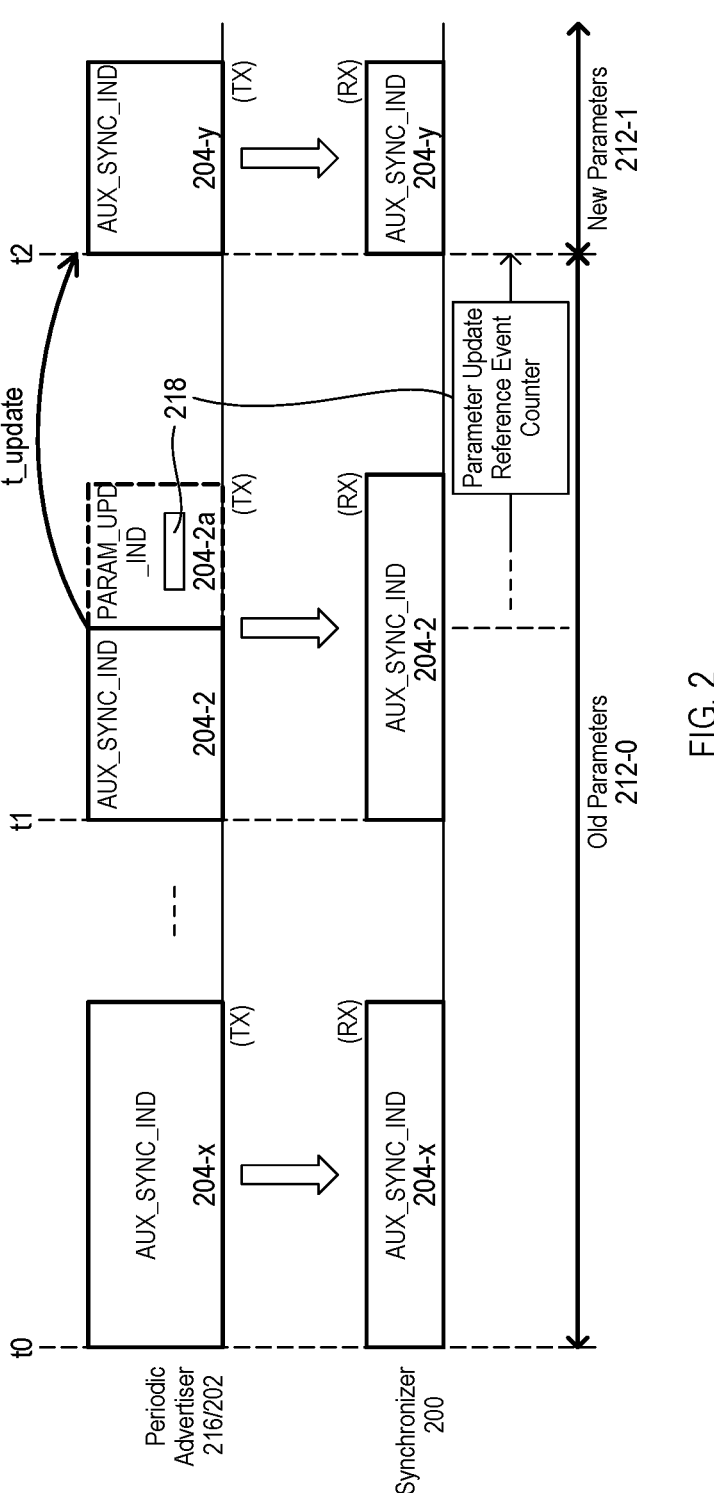
FIG. 2 is a timing diagram showing operations of a scanning device and advertising device according to an embodiment.

FIG. 2 is a timing diagram showing operations of a scanning device 200 and advertising device 216 according to another embodiment. FIG. 2 shows operations of a periodic advertiser device 216 and a scanning device 200.

Prior to time t0, a scanning device 200 can be synchronized with advertising device 216, and thus can scan for transmissions at predetermined times during a repeating interval on an advertising channel. Scanning device 200 can be operating according to current (e.g., old) parameters 212-0.

At time t0, a scanning device 200 can detect, and optionally process an advertising packet 204-x. In the embodiment shown, such packet may not include new operating parameters for the scanning device 200.

At time t1, a scanning device 200 can detect and process a parameter packet 204-2. Such a parameter packet 204-2 can be expected according to synchronization information previously received. Parameter packet 204-2 can include new parameter data 204-2a as well as event counter data 218. A scanning device 200 can update its operations according to new parameter data 204-2a. In addition, event counter data 218 can be used to determine when new parameter data 204-2a can take effect (t_update). In the embodiment shown, a change in operation can be timed for time t2.

Prior to time t2, scanning device 202 (and if suitable, advertising device 216) can prepare for operations according to new parameter data 204-2a.

At time t2, according to event counter data 218, scanning device 202 can switch to operating according to the new parameter data 212-1. A scanning device 202 can scan for packets (e.g., 204-*y*) according to new parameter data.

In some embodiments, a scanning device 200 and advertising device 216 can operate according to a BT standard. In a PADVB-like embodiment, a broadcast by a periodic advertiser 216 can send updated synchronization parameters. Such an update operation can take any suitable form, including but not limited to: a data type (e.g., "PARAM_UPD_IND") in the ACAD field of an AUX_SYNC_IND PDU; a new advertising data type in an AUX_SYNC_IND PDU; or a custom or application specific way of updating parameters in the data portion of the AUX_SYNC_SUB-EVENT_IND PDU, which can repeat within an advertising interval.

In this way, a scanning device can synchronize itself with a repeating advertising device to receive new parameter data and update timing data. A scanning device can switch to operating under the new parameter data based on the update timing data.

Figure 3:
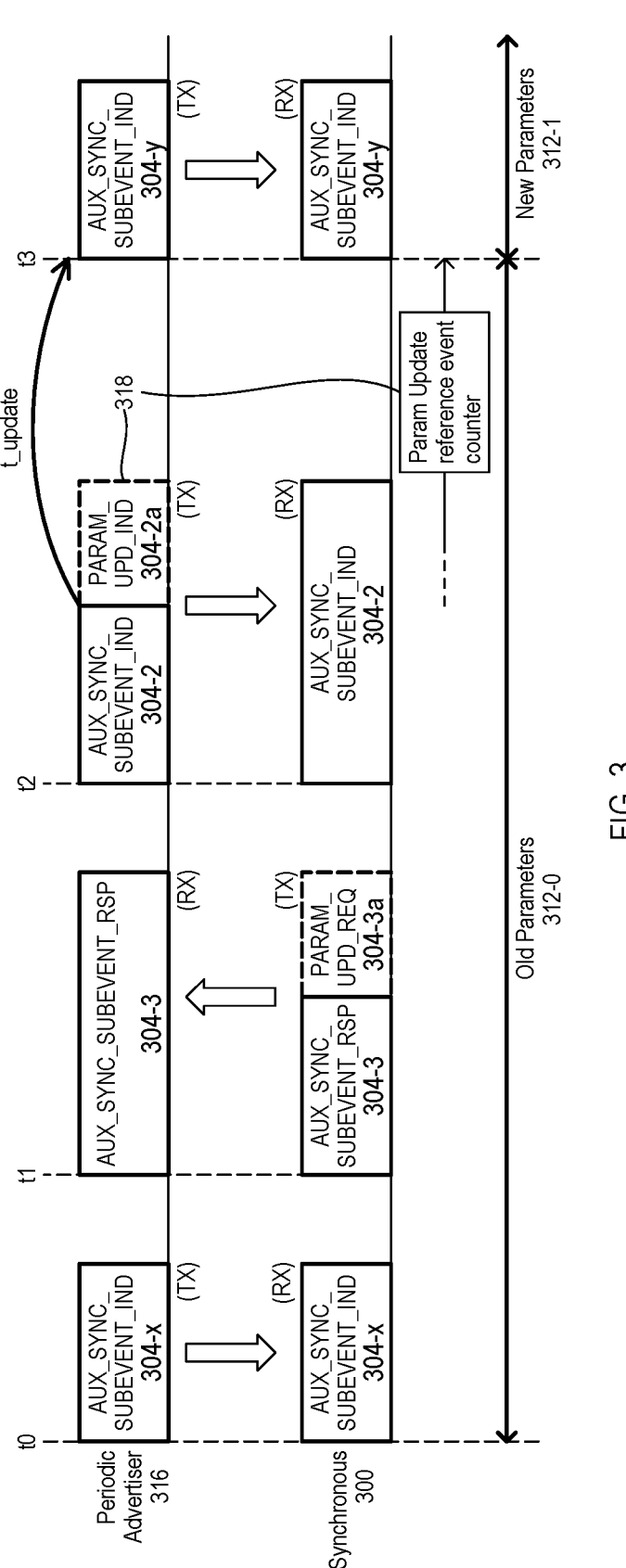
FIG. 3 is a timing diagram showing operations of a scanning device and advertising device according to another embodiment.

FIG. 3 is a timing diagram showing operations of a scanning device 300 and advertising device 316 according to another embodiment.

Prior to time t0, a scanning device 300 can be synchronized with advertising device 316 on one or more advertising channels and operating according to current parameters 312-0, as described for embodiments herein and equivalents.

At time t0, a scanning device 300 can detect, and optionally process an advertising packet 304-*x* according to old parameters.

At time t1, a scanning device 300 can transmit an update request packet 304-3. The timing of such a request packet can be established according to synchronization information previously received. Update request packet 304-3 can include a request for parameter data 304-3*a*. A periodic advertiser 316 can expect and process such an update request packet 304-3. In some embodiments, an advertising device 316 can process other request packets received from other devices on the same or different channel. In some embodiments, in response to one or more update request packets (e.g., 304-3), an advertiser device 316 can generate new parameter data.

At times t2 to t3, operations can occur as described for times t1 to t2 in FIG. 2, including switching operations based on new parameter data based on update counter data 318.

In some embodiments, a scanning device 300 and advertising device 316 can operate according to a BT standard. In a PAwR-type embodiment, a scanning device 300 can transmit parameter data 304-3*a* on a broadcast channel for an advertiser device 316 to receive and generate update parameters. A scanning device 300 (e.g., synchronized receiver) can send parameter update requests to a periodic advertiser 316 with any suitable method, including but not limited to: a new data type (e.g., "PARAM_UPD_REQ") in the ACAD field of an AUX_SYNC_SUBEVENT_RSP PDU, a new Adv Data type designated to contain a parameter update request in the AUX_SYNC_SUBEVENT_RSP PDU or a custom or application specific way of requesting parameter update in the AUX_SYNC_SUBEVENT_RSP PDU.

In this way, a scanning device can synchronize itself with a repeating advertising device to request parameter data. In response, another device (e.g., an advertising device) can generate parameter data, and transmit such parameter data during a predetermined time on an advertising channel. A scanning device can receive such new parameter data and switch to operating under the new parameter data based on the update timing data.

Figure 4:
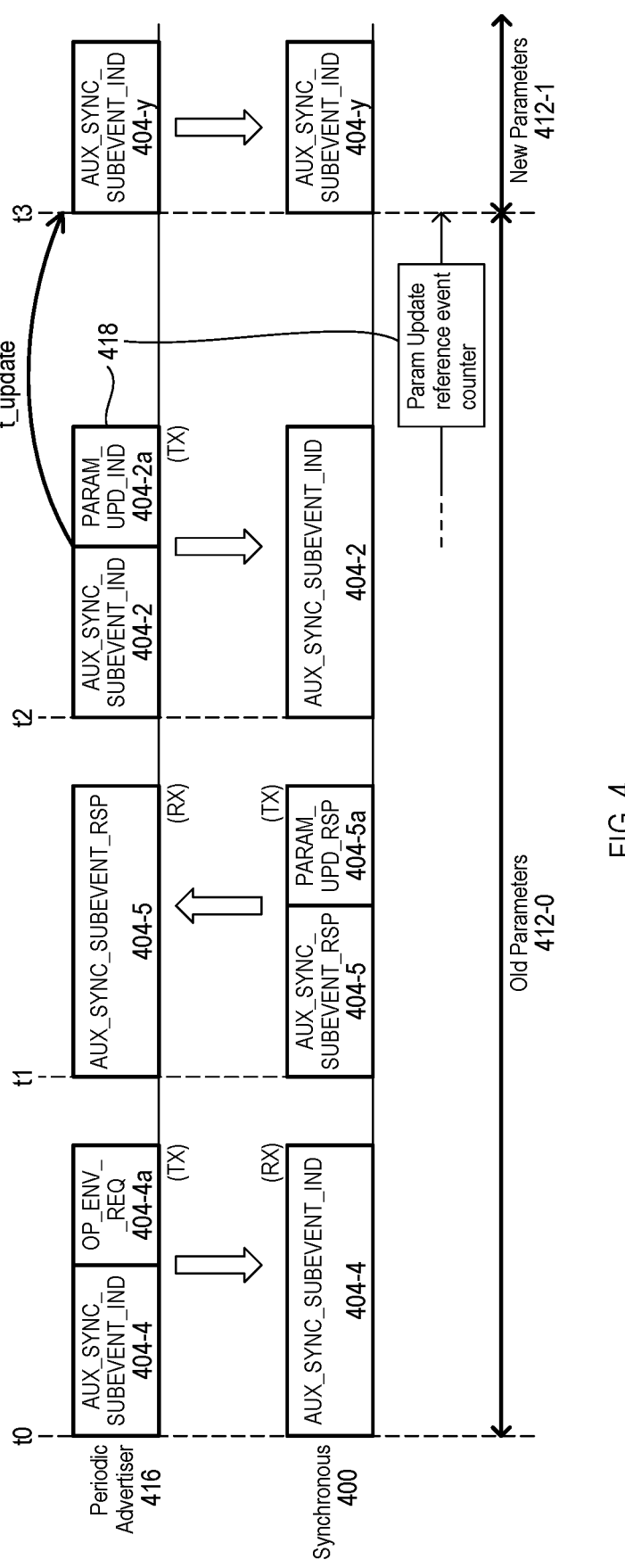
FIG. 4 is a timing diagram showing operations of a scanning device and advertising device according to a further embodiment.

FIG. 4 is a timing diagram showing operations of a scanning device 400 and advertising device 416 according to another embodiment.

Prior to time t0, a scanning device 400 can be synchronized with advertising device 416 on one or more advertising channels and operating according to current parameters 412-0, as described for embodiments herein and equivalents.

At time t0, a scanning device 400 detect and process an operating environment request packet 404-4. An operating environment request packet 404-4 can include a request for devices to upload operating environment data 404-4*a*.

At time t1, in response to an operating environment request packet 404-4, a scanning device 400 can transmit an environmental response packet 404-5. An environmental response packet 404-5 can include operating environment data 404-5*a*. Operating environment data 405-5*a* can include data acquired by a device regarding its operating environment, or the operating environment of other devices. In response to receiving operating environment data 405-5*a*, an advertising device 416 can generate operating parameters.

At times t2 to t3, operations can occur as described for times t1 to t2 in FIG. 2, including switching operations based on new parameter data based on update counter data 418.

In some embodiments, a scanning device 400 and advertising device 416 can operate according to a BT standard. In a PAwR-type embodiment, a parameter update operation can be initiated by an advertising device 416. A periodic advertiser 416 can send a parameter update request PDU (e.g., 404-4) to a scanning device 400 in various methods, including but not limited to: a new data type (e.g., "OP_ENV_REQ") in the ACAD field of AUX_SYNC_SUBEVENT_IND PDU, a new Adv Data type designated to contain parameter update request in the AUX_SYNC_SUBEVENT_IND PDU, or a custom or application specific way of communication Parameter Update Request in the AUX_SYNC_SUBEVENT_IND PDU. A scanning device 400 can respond after receiving request with desired advertising parameters in any suitable manner, including but not limited to: a new data type (e.g., "PARAM_UPD_RSP") in the ACAD field of an AUX_SYNC_SUBEVENT_RSP PDU, a new Adv Data type designated to contain a parameter update response in the AUX_SYNC_SUBEVENT_RSP PDU or a custom or application specific way of communicating Parameter Update Response in the AUX_SYNC_SUBEVENT_RSP PDU.

In this way, a scanning device can transmit operating environment and/or parameter data on an advertising channel in response to a request from an advertising device. An advertising device can generate updated parameter data from the received data and transmit such updated parameter data on the advertising channel. The scanner device can update its operations according to the parameter data.

Figure 5:
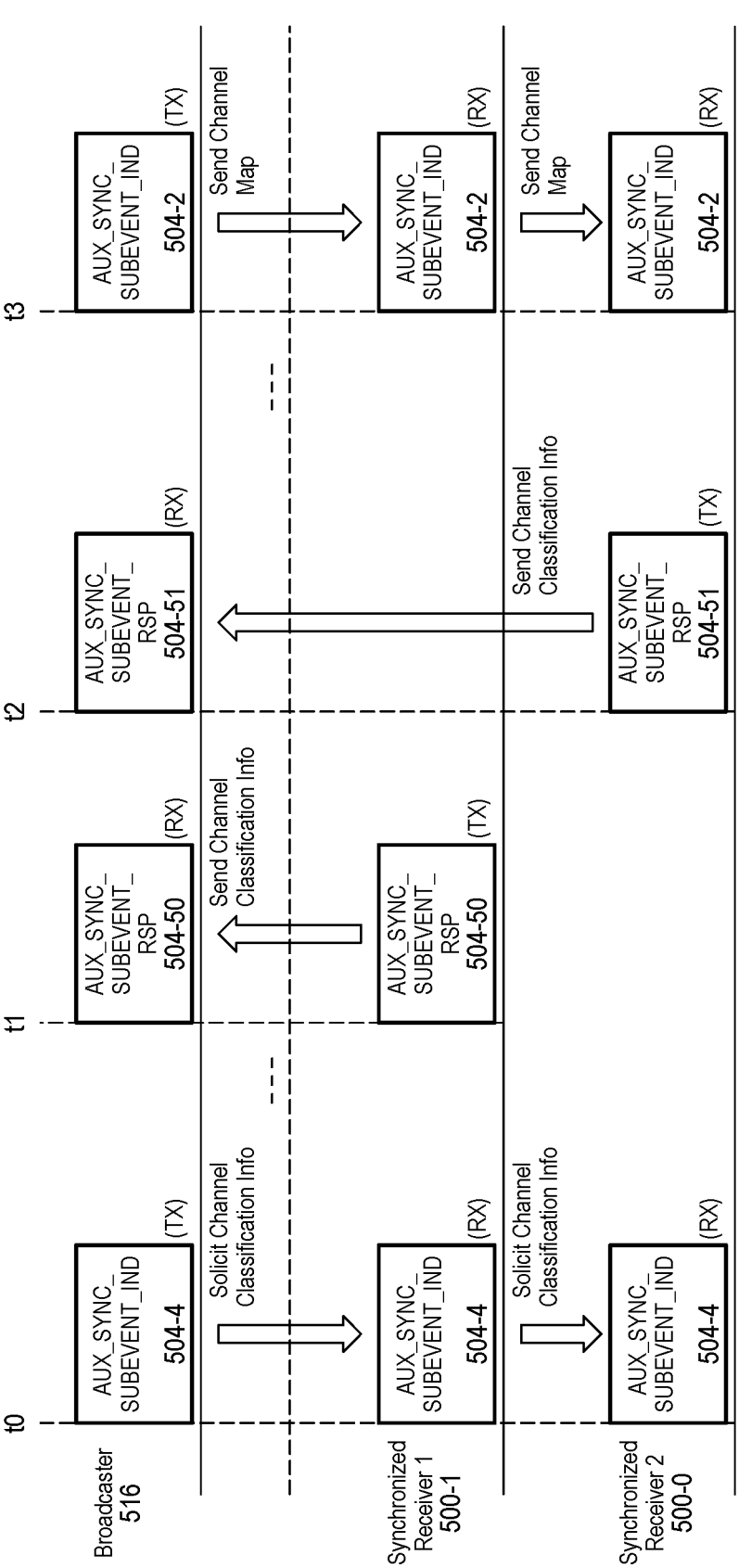
FIG. 5 is a timing diagram showing channel map operations of a Bluetooth (BT) type according to an embodiment.

FIG. 5 is a timing diagram showing channel map update operations of a BT system according to an embodiment.

Prior to time t0, scanning devices 500-0/1 can be synchronized with advertising device 516 on one or more BT advertising channels, as described for embodiments herein and equivalents. Synchronization can result in scanning devices 500-0/1 having different transmission (e.g., upload) windows within a synchronization interval. Scanning devices 500-0/1 and advertising device 516 can be part of a BT network that can frequency hop over multiple channels according to a common channel map. A BT channel map can indicate channels that are excluded from transmissions. Scanning devices 500-0/1 can maintain channel classification information, which can indicate a quality of channels as detected by the scanning devices 500-0/1.

At time t0, an advertising device 516 can transmit a channel classification request packet 504-4. Such a packet can include data indicating a request for channel classification information. In response to a channel classification request packet 504-4, scanning devices 500-0/1 can prepare channel classification information for transmission in an appropriate, synchronized window for the scanning device 500-0/1.

At time t1, an upload window for scanning device 500-1 can start and scanning device 500-1 can transmit a response packet 504-50 that includes channel classification data for the scanning device 500-1.

At time t2, an upload window for scanning device 500-0 can start and scanning device 500-0 can transmit a response packet 504-51 with channel classification data. In response to a channel classification data from scanning devices 500-0/1 (and possibly other scanning devices), advertising device 516 can generate a channel map.

At time t3, advertising device 516 can transmit a channel map update packet 504-2, which can include an updated channel map. Such a packet can be received and processed by both scanning devices 500-0/1. As a result, scanning devices 500-0/1 can operate according to the new channel map generated by the advertising device.

In some embodiments, an advertiser device 516 and scanning devices 500-0/1 can operate according to a BT standard. In a PAwR-type embodiment, a channel map update operation can be initiated by an advertising device 516. An advertiser device 516 can solicit channel classification info from scanning devices (e.g., synchronized receivers) according to any suitable method, including but not limited to: a new data type (e.g., "Channel Classification Info Request") in the ACAD field of the AUX_SYNC_SUB-EVENT_IND message; a new Adv Data type designated to request Channel Classification Info in the AUX_SYNC_SUBEVENT_IND message; or a custom or application specific way of soliciting Channel Classification Info in the data portion of the AUX_SYNC_SUBEVENT_IND message.

In a PAwR-type embodiment, upon receiving a solicitation for channel classification info from an advertiser device, a controller or similar section of the scanning devices 500-0/1 can inform a corresponding host of the received channel classification request. In other embodiments, a host at each scanning device 500-0/1 can request a corresponding controller to provide the channel classification info. Scanning devices 500-0/1 can send channel classification info to the advertising device in any suitable manner, including but not limited to: a new data type (e.g., "Channel Classification Info") in the ACAD field of the AUX_SYNC_SUBEVEN-T_RSP message; a controller at each scanning device 500-0/1 can inject this information autonomously in a packet being sent to the broadcaster (subject to having enough space/air-time); a new Adv Data type designated to contain Channel Classification Info in the AUX_SYNC_SUBEV-ENT_RSP message; or a custom or application specific way of communicating Channel Classification Info in the AUX_SYNC_SUBEVENT_RSP message. In alternate embodiments, a controller or equivalent section of a scanning device 500-0/1 may provide channel classification information to a host, enabling such a host to include the channel classification info in a response packet.

In a PAwR-type embodiment, an advertiser device 516 can receive channel classification information from multiple scanning devices and evaluate such data to arrive at an updated channel map. An updated channel map can then be provided to scanning devices 500-0/1 in any suitable manner. In some embodiments, this can include an advertiser device 516 transmitting an AUX_SYNC_SUBEVENT_IND PDU having the updated channel map on a broadcast channel. However, any other suitable methods can be employed as described herein or an equivalent.

In this way, an advertising device can solicit channel classification information from devices over a synchronized broadcast channel slot and receive such classification from scanning devices via synchronized broadcast channel slots. An advertising device can generate updated channel map data and provide such updated channel map data via a synchronized broadcast slot. Scanning devices can update their channel maps accordingly.

Figures 6, 7:
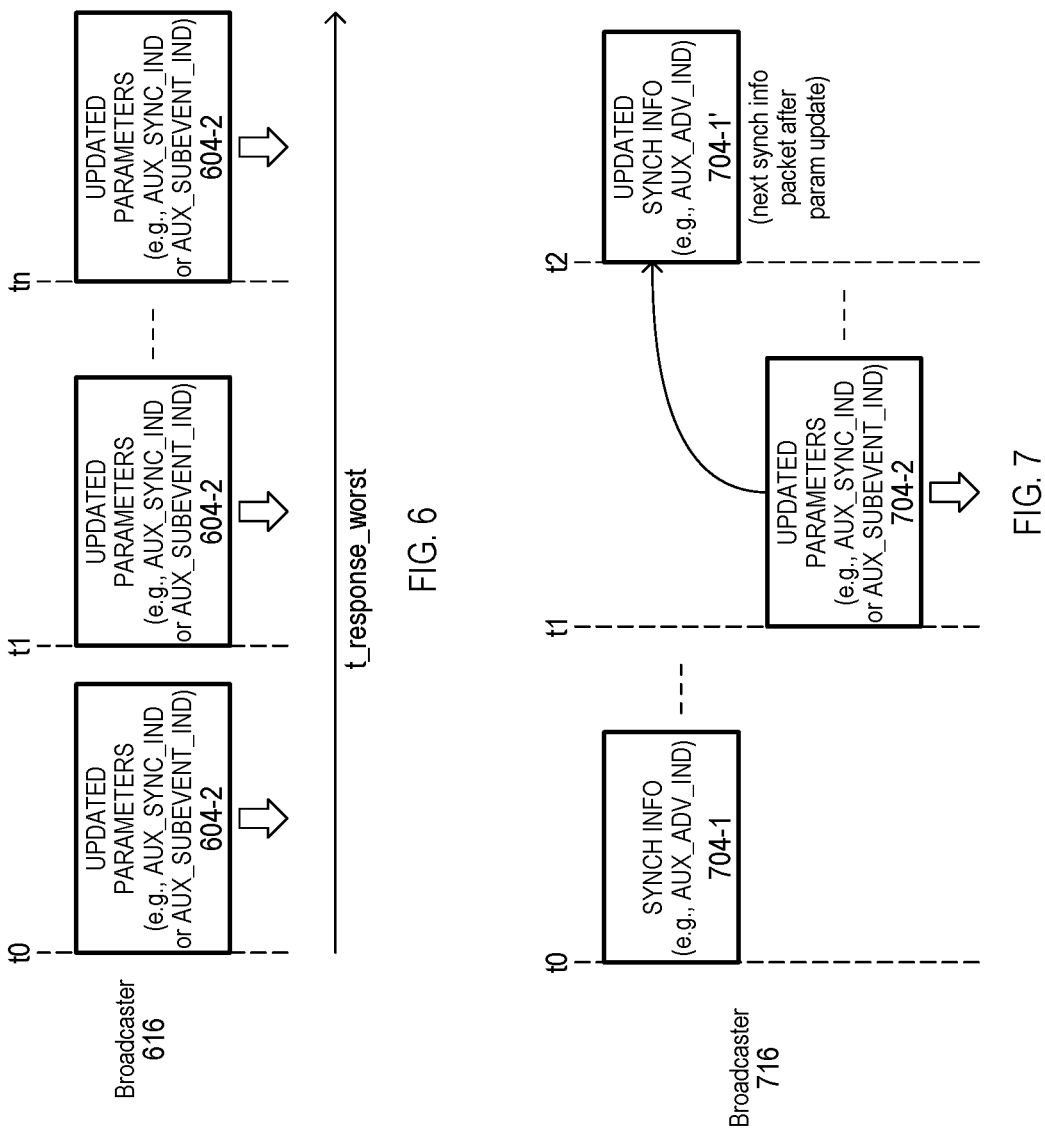
FIG. 6 is a timing diagram of advertising device operations according to another embodiment.
FIG. 7 is a timing diagram of advertising device operations according to a further embodiment.

FIG. 6 is a timing diagram of advertiser device 616 operations according to an embodiment. In the operation shown, advertiser device 616 can repeat a parameter update packet 604-2 at synchronized sub-intervals or intervals. Such repetition can occur over a duration t_response_worst, which can correspond to a worst case response time amongst all scanning devices. While repetition of a parameter update packet 604-2 can occur on consecutive sub-intervals, in other embodiments such repetition may not be consecutive.

In some embodiments, advertiser device 616 can operate according to a BT standard, and repeated parameter update packets can be AUX_SUBEVENT_IND PDUs or AUX_SYNC_IND PDU.

In this way, an advertising device can repeat parameter update packets over a synchronized link to ensure all scanning devices can receive (and optionally respond to) such new parameter data.

FIG. 7 is a timing diagram of advertiser device 716 operations according to another embodiment. In the operation shown, advertiser device 716 can update synchronization information 704-1' for a synchronized link following a parameter update packet 704-2. In some embodiments, a packet with the updated synchronization information 704-1' can be broadcast at the next suitable time (e.g., interval or sub-interval) following the parameter update packet 704-2. In some embodiments, such an update can include any synchronization information affected by new parameters. In this way, if a scanning device loses synchronization with the broadcast link, the scanning device can re-establish synchronization with the link.

In some embodiments, advertiser device 716 can operate according to a BT standard, and an updated synchronization information packet can be an AUX_ADV_IND PDU.

In this way, synchronization information for a synchronized link can be updated following the broadcast of parameter update information.

Figures 8, 9:
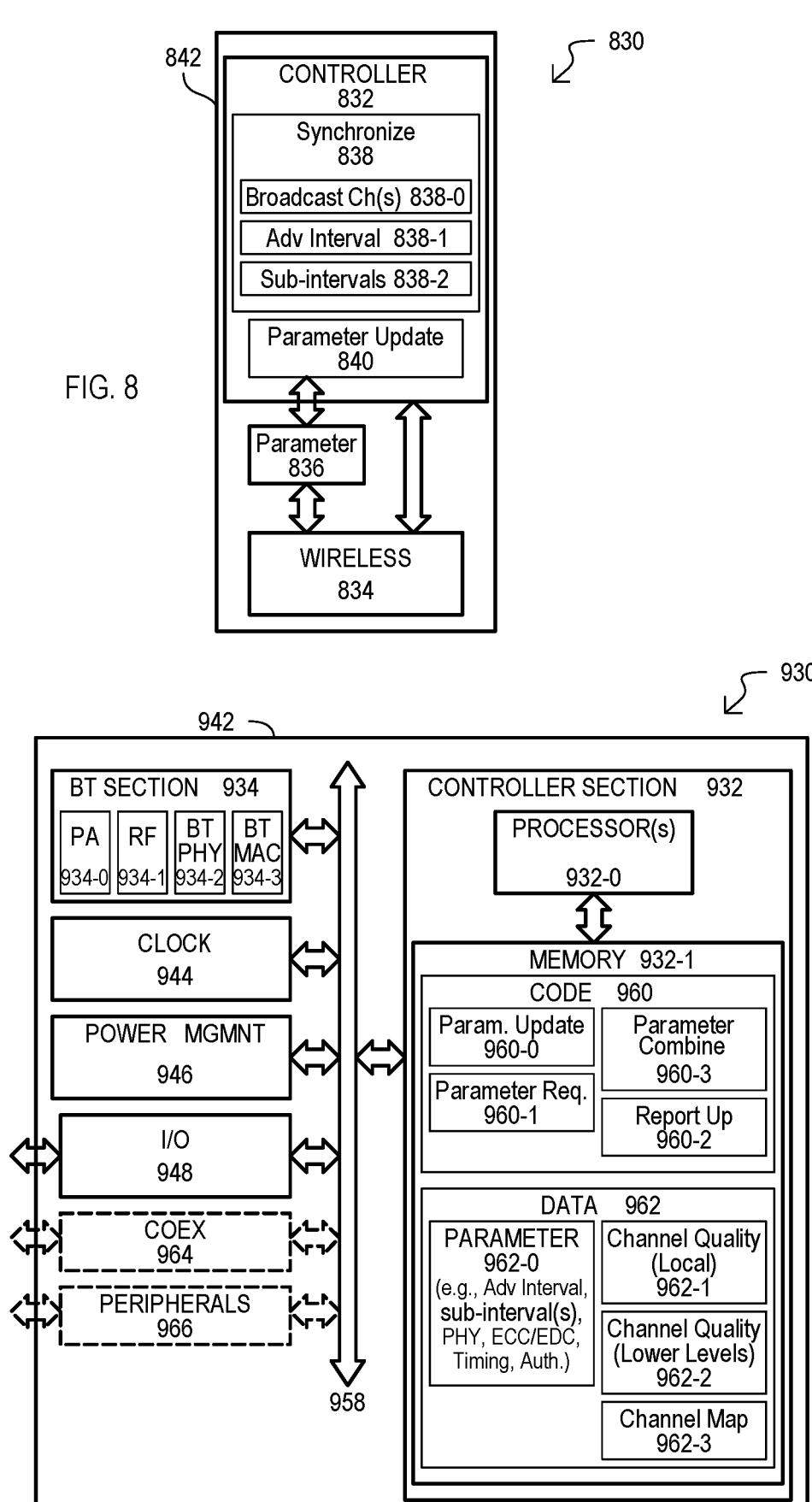
FIG. 8 is a block diagram of a wireless device according to an embodiment.
FIG. 9 is a block schematic diagram of a wireless device according to another embodiment.

While embodiments can include various operations and methods described herein, embodiments can also include devices that execute such methods and operations. FIG. 8 is a block diagram of a device 830 according to an embodiment. A device 830 can include a controller section 832, wireless circuits 834 and a parameter store 836. A controller section 832 can execute functions for scanning devices as described herein, and equivalents, and can be composed of any suitable circuits, including but not limited to: one or more processors with corresponding instructions, custom logic and/or programmable logic.

A controller section 832 can include synchronizing circuits 838 and parameter update circuits 840. Synchronizing circuits 838 can detect advertising links and derive timing for such links. In the embodiment shown, synchronizing circuits 838 can store or derive one or more broadcast channels 838-0, an interval value 838-1 (e.g., duration, timing relative to a known point in time) and sub-interval values 838-2 (e.g., duration, number, timing). Synchronizing circuits 838 can also receive updated operating parameter values via a synchronized advertising link. Parameter update circuits 840 can update operating parameters based on new operating parameters received via a synchronized link.

A parameter store 836 can store operating parameters, including those used to control communications. Operating parameters can include any of those described herein or equivalents. Wireless circuits 834 can enable communication according to one or more wireless standards, including but not limited to one or more BT standards. Wireless circuit 834 operations can vary according to operating parameters 836.

In some embodiments a device 830 can be formed with a same integrated circuit substrate 842.

In this way a wireless device can receive new operating parameters over a synchronous broadcast link and continue communications over the link while operating according to the new parameters, without the link having to be re-established.

FIG. 9 is a block diagram of a device 930 according to another embodiment. A device 930 can be an integrated circuit (IC) device configured to provide BT communications. A device 930 can be one implementation of a scanning device as described herein. A device 930 can include a controller section 932, BT section 934, clock circuits 944, power management circuits 946, and input/output (I/O) circuits 948 in communication with one another over a bus system 958. Controller section 932 can include processors 932-0 and a memory sub-system 932-1. Processors 932-0 can include one or more processor circuits configured to execute code to provide various functions.

Memory sub-system 932-1 can include code 960 and data 962. Code 960 can be executed by processors 932-0, and can include parameter update code 960-0, parameter request code 960-1, report up code 960-2 and parameter combine code 960-3. Parameter update code 960-0 can enable a device 930 to update communications with a periodic advertiser link without expectation of the link having to be re-established. Parameter request code 960-1 can generate packets for requesting updated parameters from an advertising device. Parameter combine code 960-3 can combine channel quality data received from other devices lower in a network architecture/hierarchy. Report-up code 960-2 can generate packets that can include combined channel quality data for transmission to a device higher in a network architecture. The various operations provided by code 960 can take the form of any of those described herein and equivalents, including the reception and transmission of packets during predetermined sub-intervals (e.g., sub-event).

Data 962 can store any data suitable for operating as a scanning device, including but not limited to parameters 962-0, local channel quality data 962-1, lower level quality data 962-2 and channel map data 962-3. Parameters 962-0 can be operating parameters relating to or controlling communications with an advertising link. Parameters 962-0 can include but are not limited to: data related to an advertising interval, data related to sub-intervals (e.g., sub-events), physical layer information, error detection/correction data, timing information and authentication data. Local channel quality data 962-1 can include channel quality determined by the device 930, and can take any suitable form, including but not limited to one or more bit values indicating quality, or a measured quality value (e.g., a bit error rate, packet error rate). Lower level quality data 962-2 can include channel quality data received from other devices, and can be combined into a different form or format for transmission in a reporting packet. A channel map 962-3 can indicate BT channels that are not used for communication in the BT network.

In some embodiments, the various circuits of device 930 can be formed with a same IC substrate 942.

A BT section 934 can include circuits for communications compatible with BT standards. A BT section 934 can include power amplifier circuits 934-0, RF circuits 934-1, BT physical layer (PHY) circuits 934-2 and BT MAC layer circuits 934-3. A clock circuit 944 can control timing for a device and can be used to maintain synchronization with an advertising channel. Power management circuits 946 can control power to a device 942. I/O circuits 948 can provide an interface for other devices to communicate and/or control device 930. In some embodiments, I/O circuits 948 can provide an interface suitable with one or more serial communication standards, including but not limited to SPI, I2C or USB.

Optionally, a device 930 can include coexistence circuits 964 which can enable coordination of BT operations with another wireless standard, such as an IEEE 802.11 wireless standard (e.g., WiFi), as but one example. Optionally, a device 930 can include peripheral related circuits 966 which can include circuits that can provide a number of additional functions related to applications, including but not limited to: analog circuits (e.g., ADCs, DACs), modulation circuits (e.g., PWM, PCM, sigma-delta), audio circuits (microphones, speakers), display driver circuits or sensor circuits.

In this way, a device can synchronize with an advertising link, receive parameter data from the link, upload parameter data from other devices to the link and change parameters for the link without the link having to be re-established.

Figure 10:
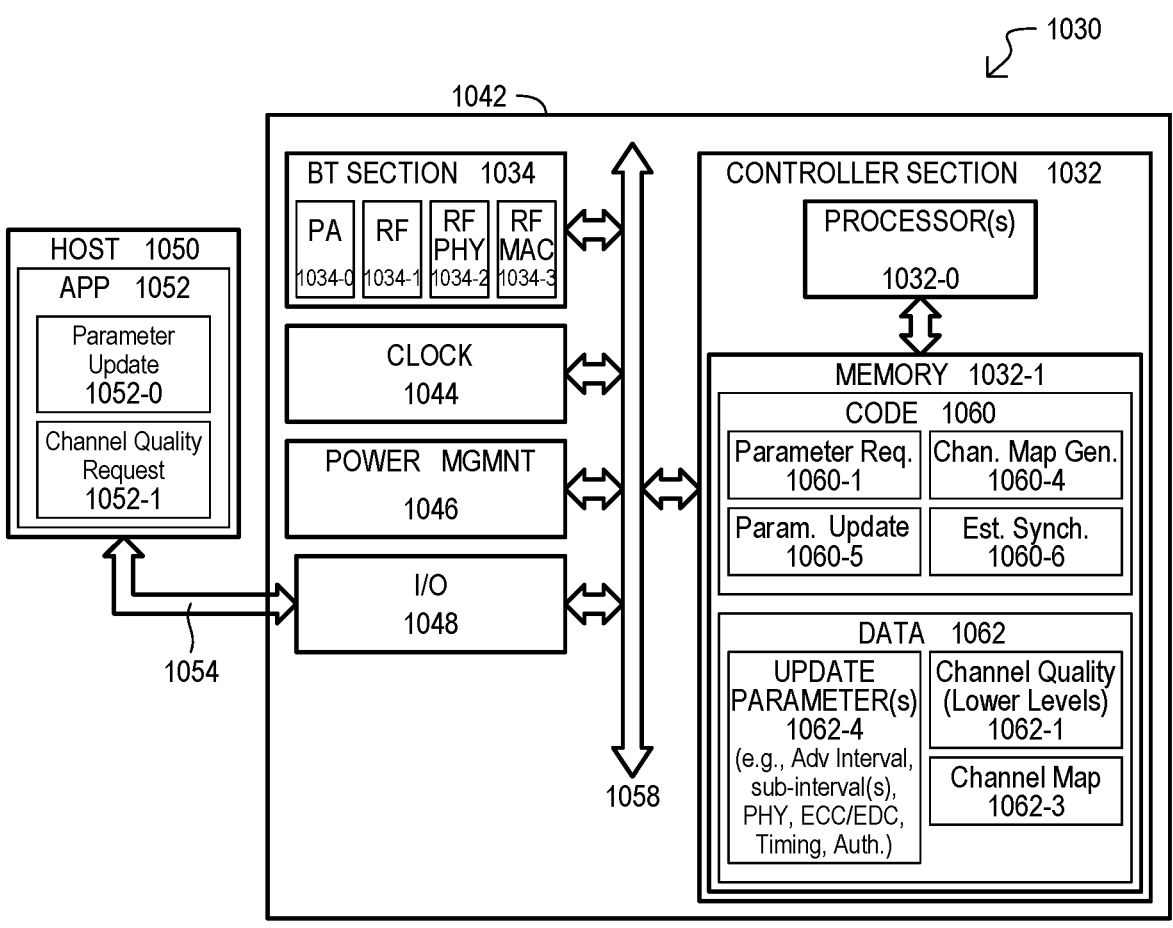
FIG. 10 is a block schematic diagram of a wireless device according to a further embodiment.

FIG. 10 is a block diagram of a device 1030 according to another embodiment. A device 1030 can be one embodiment of an advertiser device as described herein. A device 1030 can include items like those shown in FIG. 9, and such items are referred to by the same reference character but with the leading digits being "10" instead of "9".

A device 1030 can differ from that of FIG. 9 in that code 1060 can include channel map generation code 1060-4, parameter update code 1060-5 and establish synchronization code 1060-6. By execution of channel map generation code 1060-4 controller section 1032 can generate channel map data 1062-3 in response to lower level channel quality data 1062-1. By execution of parameter update code 1060-5 controller section 1032 can generate new parameter data which can be transmitted on a synchronized advertising channel for download by scanning devices as described herein and equivalents. By execution of establish synchronization code 1060-6 a device 1030 can establish a synchronized advertising link as described herein and equivalents, including changing parameters of such a link without having to re-establish the link.

A device 1030 can also differ in that data 1062 can include updated parameters 1062-4. Updated parameters 1062-4 can be generated by controller section 1032 for distribution to other devices via a synchronized advertising link.

In some embodiments, a device 1030 can be in communication with a host device 1050 which can execute one or more applications 1052. While FIG. 10 shows a host device 1050 in communication with device 1030 via a bus 1054, such communication can include any suitable form, including a wireless connection. In some embodiments, a host device 1050 can execute parameter update operation 1052-0 and a channel quality request operation 1052-1 instead of a controller section 1032. Such operations can include a host device 1050 creating payload data that indicates to a scanning device that updated parameters are included or that channel quality is being requested.

In this way, a device can synchronize with an advertising link, receive parameter data from the link, upload parameter data from other devices to the link and change parameters for the link without the link having to be re-established.

Figure 11:
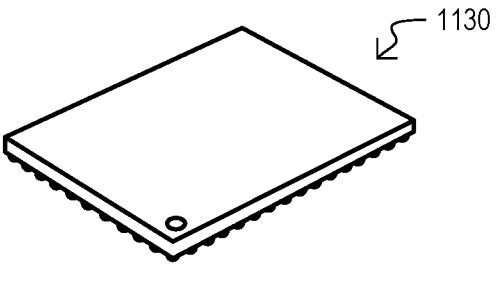
FIG. 11 is a diagram of an integrated circuit device according to an embodiment.

While embodiments can include devices with various interconnected components, embodiments can have a unitary structure which can enable the update of communication parameters via a synchronized advertising link as described herein and equivalents. Such unitary devices can be advantageously compact single integrated circuit (IC) devices. FIG. 11 shows one particular example of a device 1130 formed in a single IC package. In some embodiments, device 1130 can include a single die in the package. However, it is understood that a combination device according to embodiments can include any other suitable integrated circuit packaging type, as well as direct bonding of a combination device die onto a circuit board or substrate.

Figure 12A:
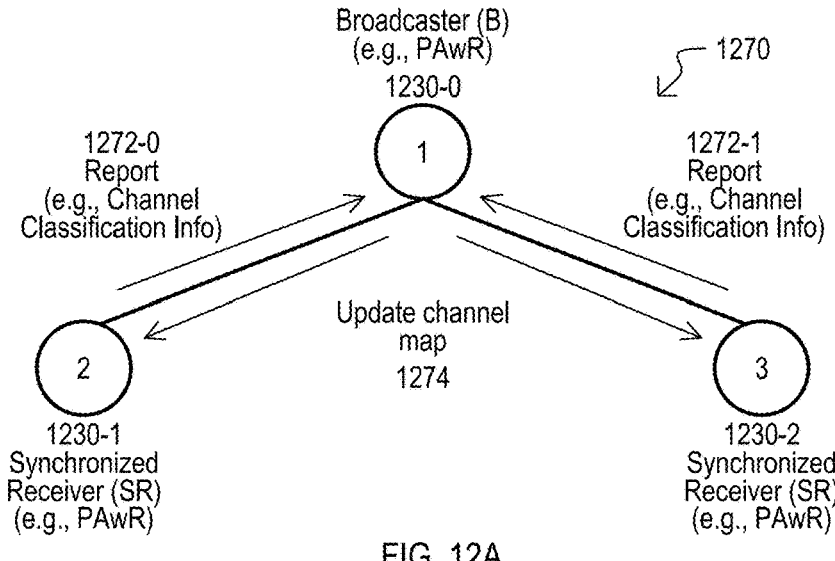
FIG. 12A is a diagram showing a system according to an embodiment.

FIG. 12A is a diagram showing a system 1270 according to an embodiment. A system 1270 can include a broadcaster (e.g., advertiser device) 1230-0 and multiple synchronized receivers (SRs) (e.g., scanning devices) 1230-1/2. A broadcaster 1230-0 can establish an advertising link on one or more broadcast channels that can indicate an interval and sub-intervals to which other devices can synchronize the download and upload of data. Different SRs 1230-1/2 can be designated or assigned different sub-intervals and/or different broadcast channels.

According to embodiments, SRs 1230-1/2 can report operating environment data to broadcaster 1230-0 by transmitting packets during predetermined upload sub-intervals of the advertising link. SRs 1230-1/2 can report operating environment data of their own accord, or in response to requests from a broadcaster 1230-0. Broadcaster 1230-0 can receive operating environment data from SRs 1230-0/1 and generate one or more updated operating parameters in response. A broadcaster 1230-0 can return updated operating parameter(s) 1274 to SRs 1230-1/2 by transmitting packets during predetermined download sub-intervals of the advertising link.

In some embodiments, a system 1270 can be a PAwR-type BT system, with SRs 1230-1/2 transmitting operating environment data in a sub-event response and a broadcaster 1230-0 transmitting updated operating parameter(s) in a sub-event indication. In some embodiments, SRs 1230-1/2 can upload channel classification information via a synchronized link, and a broadcaster 1230-0 can generate an updated channel map in response to such channel classification information. The updated channel map can be broadcast to the SRs 1230-1/2 over the advertising link.

In this way, operating environment data (e.g., channel classification information) can flow back from scanning devices to an advertiser device via a synchronized link.

Figures 0, 12B:
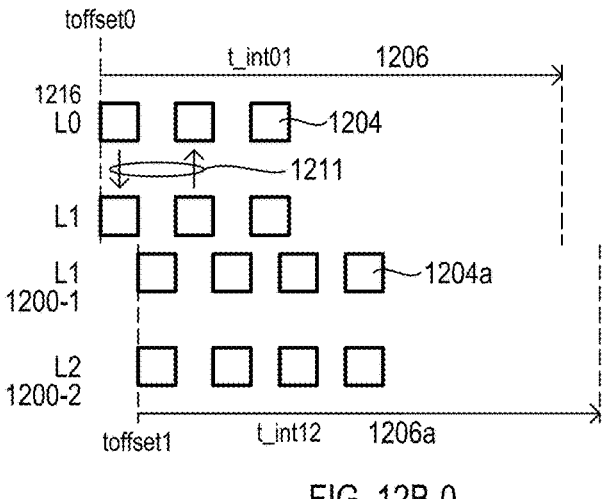
Figures 1, 12B:
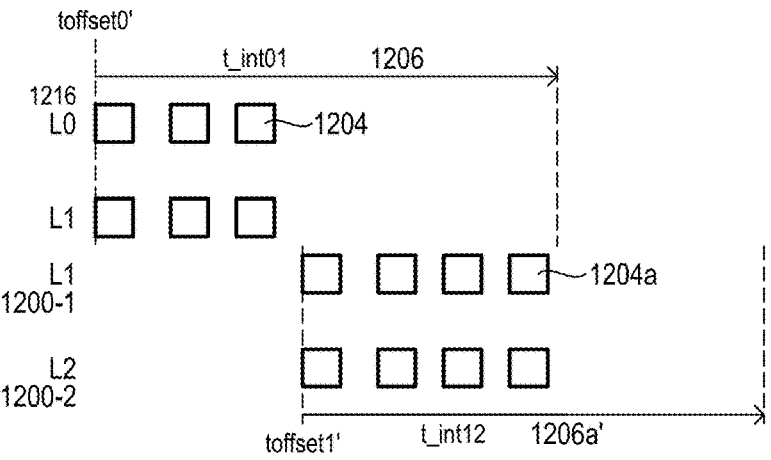

In some embodiments, systems can update timing parameters for an advertising link between different devices. FIGS. 12B-0 and 12B-1 are timing diagrams showing parameter update operations that can adjust timing values of advertising links with respect to one another according to embodiments. FIG. 12B-0 shows communications prior to a parameter update.

FIG. 12B-1 shows communications after a parameter update.

FIG. 12B-0 is a timing diagram showing a top layer node L0 1216, an intermediate layer node 1200-1 and a lower layer node 1200-2. An L0-L1 advertising link can enable L0 node 1216 and L1 node 1200-1 to communicate via synchronized timing slots (one shown as 1204), which can be advertising sub-intervals, as described herein. An L1-L2 advertising link can enable L1 node 1200-1 to communicate with L2 node 1200-2 via synchronized timing slots (one shown as 1204a). Timing for L0-L1 advertising link intervals 1206 can be based on a timing value, which in example shown can be a value toffset0. Timing for L1-L2 advertising link intervals 1206a can be based on a value toffset1.

Referring to FIG. 12B-0, according to embodiments, timing adjustment operations can include communications 1211 between L0 node 1216 and L1 node 1200-1. Such communications can take any suitable form. In one embodiment, L0 node 1216 can query L1 node 1200-1 for timing information in a download sub-interval of a L0-L1 advertising link. In response to such a query, L1 node 1200-1 can determine a desired timing value. In some embodiments this can include deriving a timing value that minimizes adverse effects of link L0-L1 on link L1-L2. A desired timing value can then be transmitted in an upload sub-interval for node L0 1216 to receive. Node L0 can then adjust the timing of the L0-L1 link. Note, such an adjustment can occur without re-establishing the L0-L1 link. In another embodiment, L0 node 1216 can transmit its timing information in a download sub-interval of a L0-L1 advertising link. In response, L1 node 1200-1 can adjust the timing of link L1-L2 to minimize adverse effects of link L0-L1 on link L1-L2. Such an adjustment can occur without re-establishing the L1-L2 link.

FIG. 12B-1 shows timing for the system of FIG. 12B-0 following a timing adjustment. Such a timing adjustment can include any of: changing a timing value for the L0-0L1 link (e.g., toffset0 to toffset0'), changing a timing value for the L1-L2 link (e.g., toffset1 to toffset1'), or changing both. While embodiments have shown changing interval start timing, other embodiments can include changing any other suitable timing values, including but not limited to: interval duration, sub-interval duration, a number or type of sub-intervals in an interval, or transmission types (e.g., PHY selection).

Figures 0, 12C:
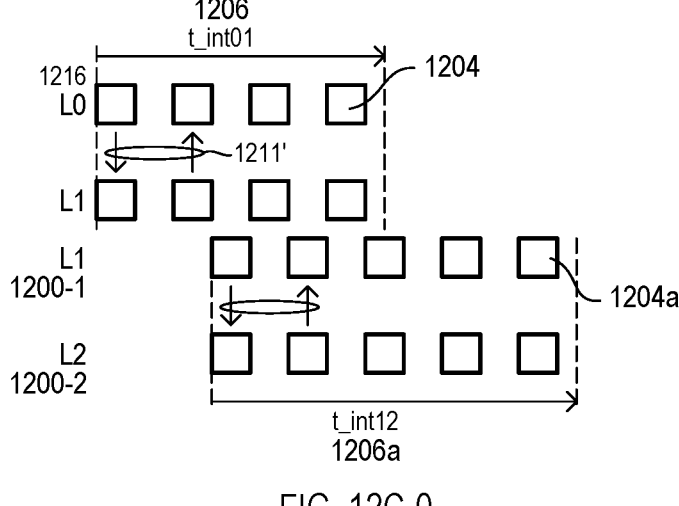
Figures 1, 12C:
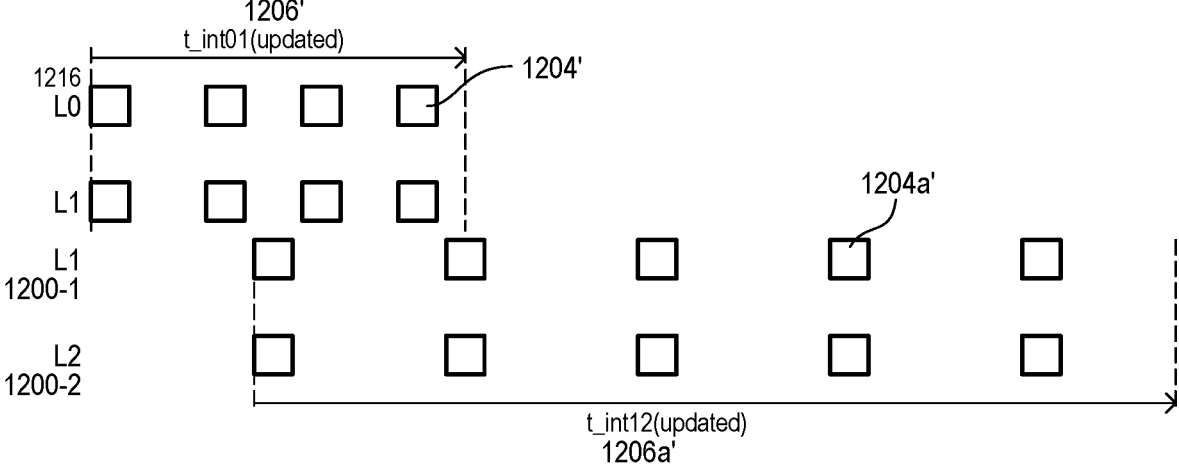

FIGS. 12C-0 and 12C-1 are timing diagrams showing parameter update operations that can adjust advertising link timing according to another embodiment. FIG. 12C-0/1 show items like that of FIG. 12B-0/1.

FIG. 12C-0 shows L0-L1 communications 1211' that can take the form of any of those described herein. Such communications can relay a global timing change, which in the embodiment shown, can include increasing the duration of intervals (and optionally sub-intervals). In response to L0-L1 communications 1211', there can be L1-L2 communications 1211a.

FIG. 12C-1 shows timing for the system of FIG. 12C-0 following a timing adjustment. The interval for the L0-L1 link has been increased (from 1206 to 1206'). The interval for the L1-L2 link has also been increased (from 1206a to 1206a'). FIG. 12C-1 also shows an example in which sub-interval timing has been increased for both the L0-L1 and L1-L2 links. However, alternate embodiments may not change sub-interval timing.

Figure 13:
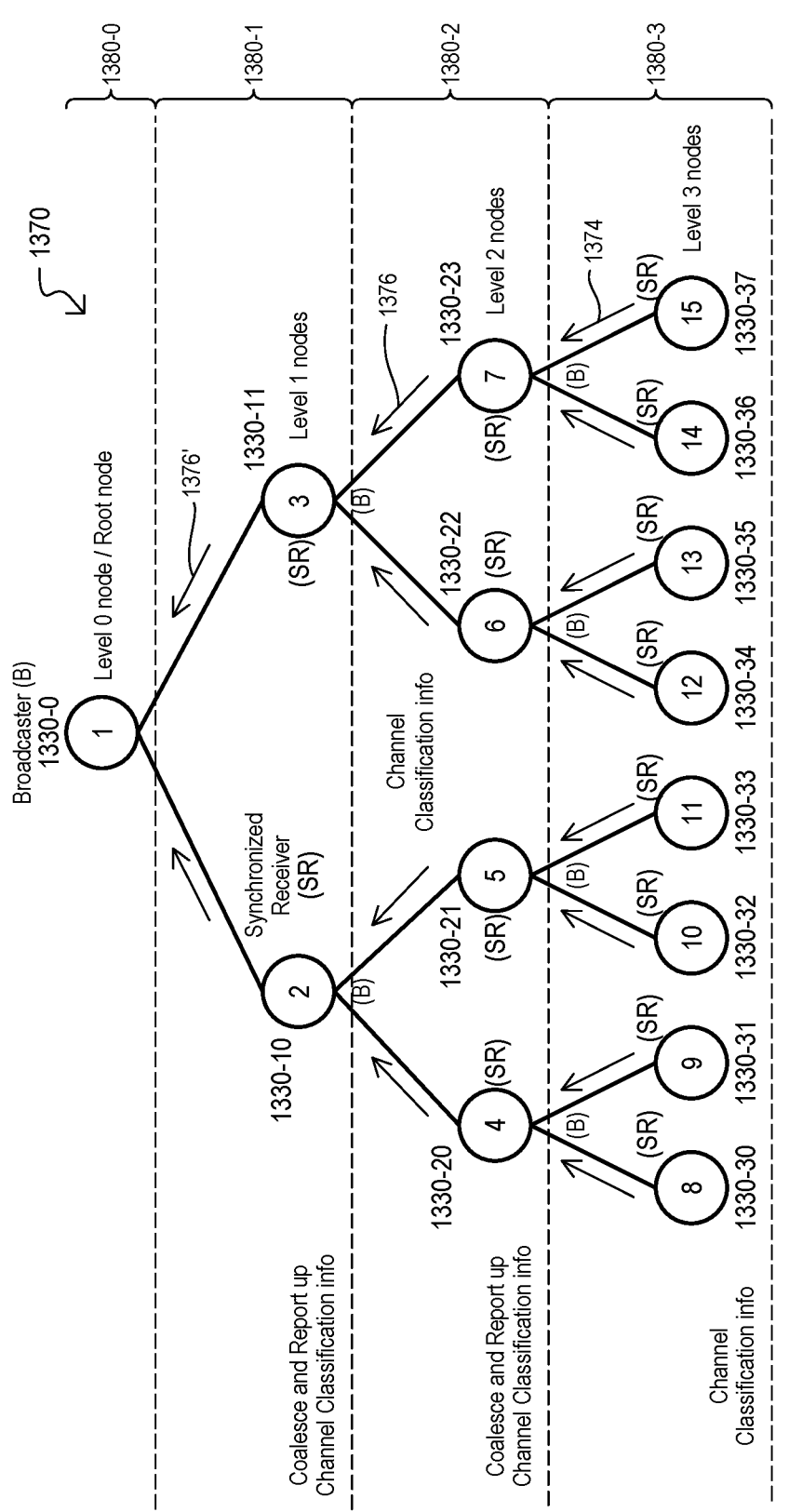
FIG. 13 is a diagram showing a multi-level network according to another embodiment.

FIG. 13 is a diagram showing a system 1370 having multiple levels of hierarchy according to an embodiment. A system 1370 can include a highest level (e.g., root node) 1380-0, intermediate levels 1380-1/2 and a lowest level 1380-3. Lowest level devices (1330-30 to 1330-37) (i.e., leaf nodes) can determine one or more values of their operating environment. Such operating environment data can be reported up to a designated higher level device with a packet (one shown as 1374). A packet 1374 can be transmitted during a predetermined sub-interval of a synchronized advertising link.

Intermediate level 1380-2 can include devices (1330-20 to 1330-23) that receive operating environment data from lower level devices (1330-30 to 1330-37) and generate combination operating environment data that is then reported up to a higher level device. Such combination operating environment data can be reported up to a designated higher level device with a reporting packet (one shown as 1376). A reporting packet 1376 can be transmitted during a predetermined sub-interval of a synchronized advertising link. Combination operating environment data can include data from multiple lower level devices as well data from the device itself. Intermediate level 1380-1 can work in the same general fashion as intermediate level 1380-2, but report combination operating environment data generated from multiple lower level combination operating environment data. Such data can be transmitted in a reporting packet 1376' during an uplink time period of an advertising link.

A root node 1380 can receive combination operating environment data from a highest intermediate level of the hierarchy (i.e., 1380-1). In some embodiments, in response to such combination operating environment data, a root node device 1330-0 can update operating parameters of a system, and then broadcast them for lower hierarchy devices over a synchronized advertising link. Such updated operating parameters can flow down through the system as described herein and equivalents.

While FIG. 13 shows pairs of lowest level devices reporting operating environment data to an intermediate level device (e.g., 1330-30/31 reporting to 1330-20), embodiments can include fewer or greater number of devices reporting to an upper level device.

In some embodiments, a system 1370 can be a PAwR-type BT system, with each level (1380-0/1/2/3) involving a PAwR broadcaster and multiple SRs (1330-10 to 37). Intermediate nodes (1330-10 to 11, 1330-20 to 23) (i.e., non-head, non-leaf nodes) can receive channel classification info from their child nodes and use it for that level. Further, channel classification info can also be coalesced and reported up the tree for better assessment of radio conditions.

In some embodiments, a system 1370 can be a BT system, a controller or application at the broadcaster 1330-0 can combine channel classification info received from the SRs 1330-10 to 1330-37 to generate an updated channel map for better network performance. An improved channel map can be achieved by a controller observing the channel classification info in the received responses. Alternatively, a host (e.g., device that includes or communicates with broadcaster 1330-0) can combine the channel classification information and use a Set_AFH_Channel_Classification command (or other HCl command/VSC) to communicate it to the broadcaster 1330-0. However, such embodiments are provided by way of example and should not be construed as limiting.

In this way, a system can include devices on multiple hierarchical levels in communication with one another over one or more synchronized advertising links. Devices can report operating environment data to higher level devices, including the combination (e.g., coalescing) of operating environment data from multiple lower level devices.

Figure 14A:
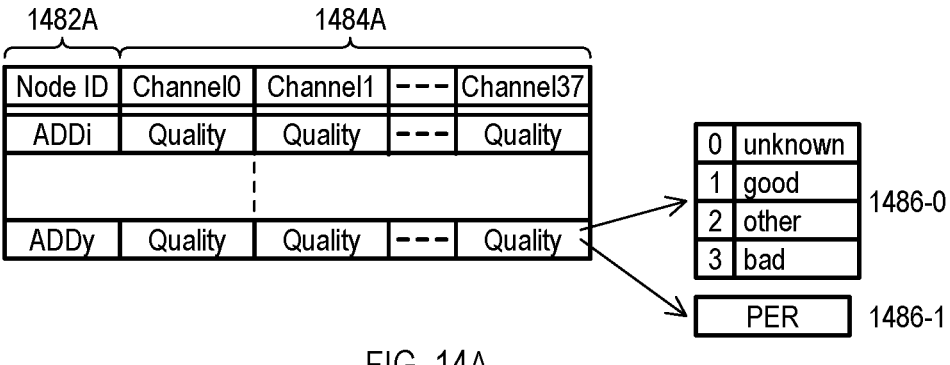
FIGS. 14A to 14C show examples of combined channel quality data that can be included in embodiments.
Figure 14B:
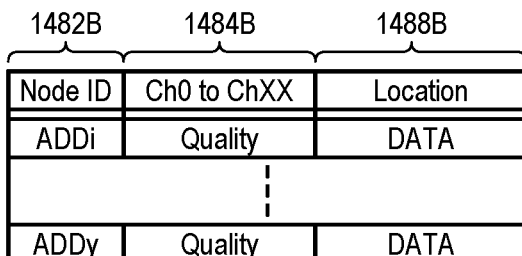
Figure 14C:
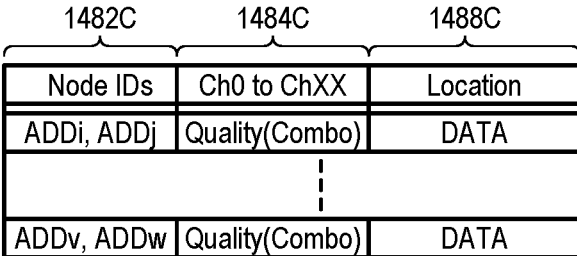

FIGS. 14A to 14C are diagrams showing examples of combined channel quality data that can be included in embodiments. FIG. 14A shows combined channel quality data that can include node (i.e., device) identification values 1482A. For each node 1482A there can be channel quality data 1484A. Channel quality data 1484A can identify the quality of channels used by devices of a system, and in FIG. 14A can include 38 channels corresponding to BLE channels. Channel quality data can take any suitable form, including but not limited to a quality value 1486-0 that can signify a channel as good or bad or a quality value 1486-1 giving a more detailed indication of quality (e.g., packet error rate). Alternate embodiments can include any other suitable method of indicating quality.

FIG. 14B shows a combined channel quality data according to another embodiment. The example of FIG. 14B shows a case that can identify nodes 1482B and channel quality for such nodes 1484B. However, additional data 1488B can be included related to the node operation. In FIG. 14B such additional data can include location data. Location data can take any suitable form, including relative location (e.g., location of a node with respect to another node) or absolute location (e.g., location calculated with a known location or location service). Location can include distance and/or direction data, including such data generated by the node itself (e.g., AoA data, AoD data). Alternate embodiments can include any other suitable data related to a nodes operating environment.

FIG. 14C is shows combined channel quality data according to a further embodiment. The example of FIG. 14C shows a case in which nodes can be grouped together for a group identification 1482C and corresponding channel quality can be a combination quality value 1484C for the group of nodes. In some embodiments, a combination quality value can include some arithmetic/logic operation on individual quality values for the group of nodes. However, any other suitable combination quality value can be used.

While FIGS. 14A to 14C show embodiments of combined channel quality data, alternate embodiments can combine any other suitable operating environment data. In some embodiments, channel quality data can be a 10-octet value compatible with a BT specification.

In this way, combined operating environment data that is reported up to higher level nodes can take any of various forms.

While embodiments can include any of the method described above with reference to the various devices and systems, additional methods will now be described with reference to flow diagrams.

Figure 15:
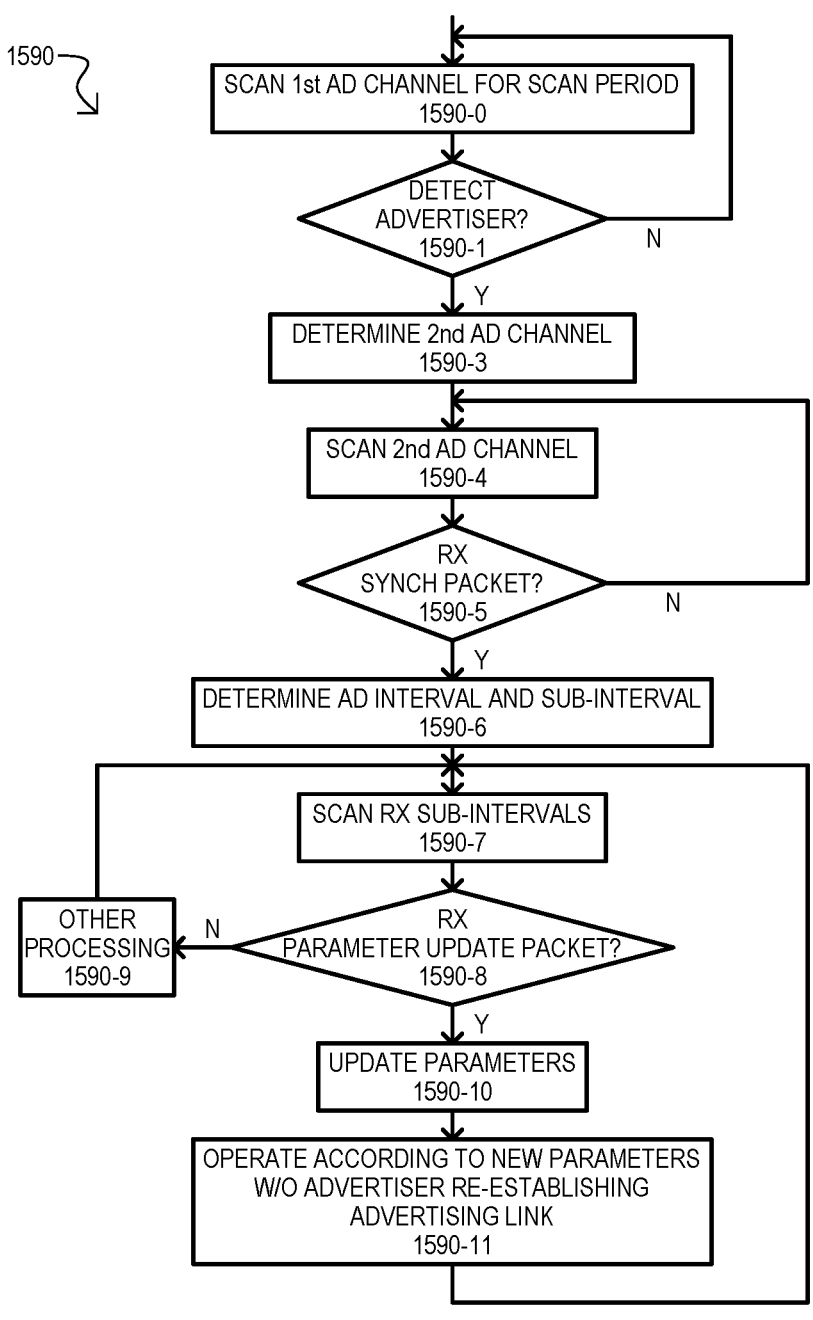
FIG. 15 is a flow diagram of a method according to an embodiment.

FIG. 15 is a flow diagram of a method 1590 according to an embodiment. A method 1590 can be executed by a scanning device. A method 1590 can include scanning a first advertising channel for a scan period 1509-0. Such an action can include scanning for packets on a channel designated for broadcast messages for a predetermined amount of time. The designated channel and time can be according to a pre-existing standard or a proprietary standard. If an advertiser is not detected while scanning (N from 1590-1), a method 1590 can continue to scan.

If an advertiser is detected (Y from 1590-1), a second advertising channel can be determined 1590-3 and scanned 1590-4. Such an action can include scanning a second advertising channel for a predetermined period. If a synchronization information packet is not received (N from 1590-5) a method 1590 can continue to scan the second advertising channel.

If a synchronization information packet is received on the second advertising channel (Y from 1590-5) a method 1590 can determine the timing for a repeating advertising interval and sub-intervals within the interval 1590-6. Such an action can include extracting timing data from a received packet and then timing packet download (and optionally packet upload) sub-interval times (i.e., synchronizing with an advertising link indicated by the packet).

A method 1590 can include scanning during receive (e.g., upload) sub-intervals 1590-7. In some embodiments, such an action can include transitioning from a non-receiving (e.g., sleeping or other low power) state, to a receiving state during one or more sub-intervals of the interval. If a packet is received that is not a parameter update packet (N from 1590-8), the packet can be processed accordingly 1590-9.

If a parameter update packet is received (Y from 1590-8), a method 1590 can update operating parameters 1590-10. Such an action can include updating operating parameters controlling or related to communicating over the synchronized advertising link. A method 1590 can operate according to the updated parameters without the advertiser having to re-establish the connection 1590-11. Such an action can include a device operating according to new parameters without reverting to scanning a first advertising channel. Such an action can include a device continuing to monitor a second advertising channel for any changes to the advertising link. Such an action can also include switching to operations according to the updated parameters at (or after) predetermined time.

According to embodiments, a system can operate according to a BT standard and a broadcaster can solicit channel classification information from PAwR SRs. SRs can send channel classification information to the broadcaster. Channel classification information can be received by the broadcaster from the SRs and integrated to generate a channel map that better suits radio conditions. In this way, a multi-level network can coalesce channel classification info at intermediate nodes and report it up the tree.

In this way, a method can include synchronizing with an advertising link, and continuing to communicate via the link even after updating operating parameters received over the link.

Figure 16:
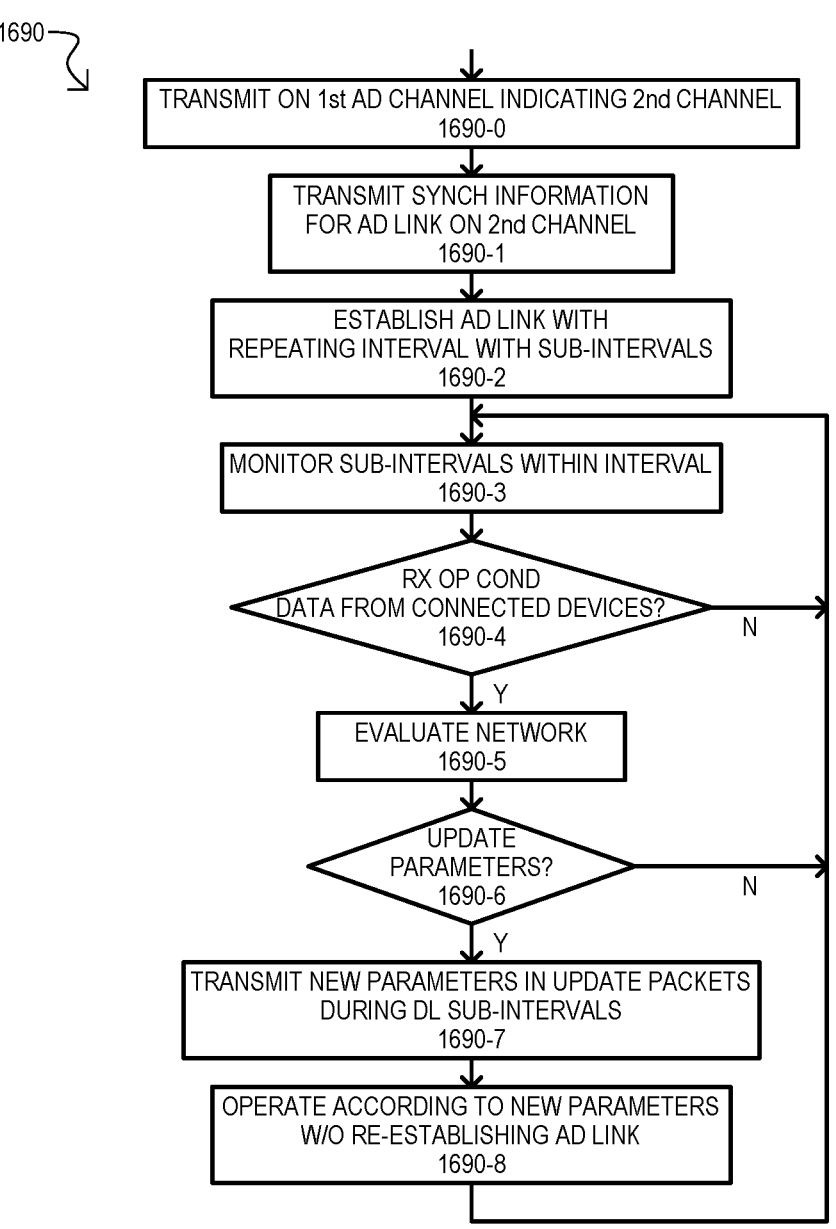
FIG. 16 is a flow diagram of a method according to another embodiment.

FIG. 16 is a flow diagram of a method 1690 according to another embodiment. A method 1690 can be executed by an advertising device. A method 1690 can include transmitting on a first advertising channel to indicate a second channel 1690-0. Such an action can include transmitting a packet at a predetermined interval on a first advertising channel. Synchronization information can be transmitted on the second channel 1690-1. Such an action can include transmitting information to enable another device to synchronize itself with broadcast data on one or more channels, which may or may not include the second channel. An advertising link can be established that includes a repeating interval having sub-intervals 1690-2. Such a link can be identified by the synchronization information.

Sub-intervals within the interval can be monitored 1690-3. Such an action can include monitoring upload sub-intervals of the advertising link. If operating condition data is not received (N from 1690-4), a method 1690 can continue to monitor advertising sub-intervals.

If operating condition data is received (Y from 1690-4), a method 1690 can evaluate a network 1690-5. Based a such an evaluation, a determination can be made as to whether parameters should be updated 1690-6. Such an action can include using received operating condition data received from multiple devices in such a determination. If a determination is made that parameters should not be updated (N from 1690-6), a method 1690 can continue to monitor sub-intervals.

If a determination is made that parameters should be updated (Y from 1690-6), a method 1690 can transmit new parameter data in update packets during download sub-intervals 1690-7. A method 1690 can then include operating according to the new parameters without re-establishing the advertising link 1690-8.

In this way, a method can include establishing a synchronized advertising link, receiving operating condition from multiple devices via such a link and then downloading updated parameters via such advertising link. Operations can continue with the new parameters without the need to re-establish the link.

Figure 17:
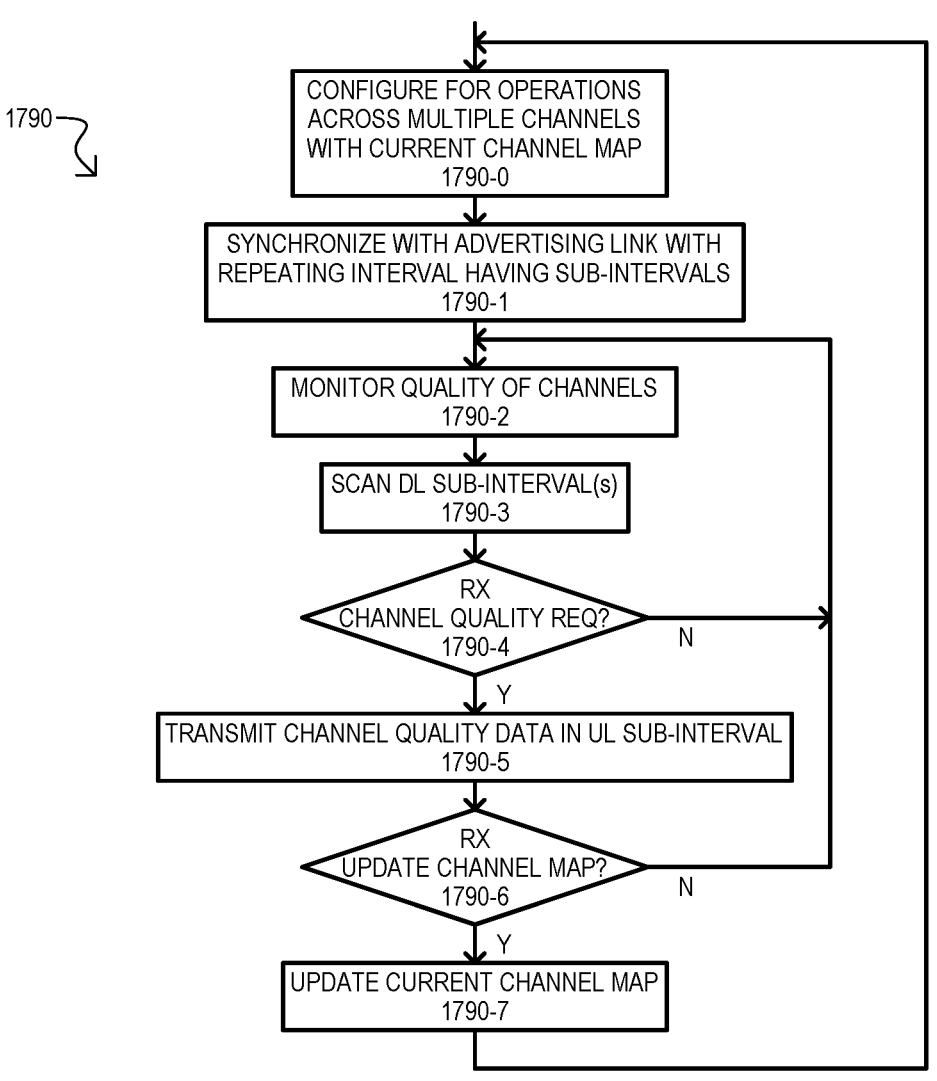
FIG. 17 is a flow diagram of a method according to a further embodiment.

FIG. 17 is a flow diagram of a method 1790 according to a further embodiment. A method 1790 can be executed by a scanning device in a network to report channel quality data to a higher level device in response to a request. A method 1790 can include configuring for operations across multiple channels with a current channel map 1790-0. Such an action can include configuring a device to receive and/or transmit over multiple channels, with channels being selected and not selected according to a channel map. A method 1790 can include synchronizing with an advertising link having a repeating interval with sub-intervals 1790-1. Such an action can include any of those described herein or equivalents.

A quality of the channels can be monitored 1790-2. Such an action can include any suitable method of determining reception (or possibly) transmission quality for all or selected of the channels. Such a determination can take any suitable form, including but not limited to: packet error rate, bit error rate, packet delivery ratio, or packet loss or jitter. A method 1790 can scan download sub-intervals 1790-3. If a channel quality request is not received (N from 1790-4), a method 1790 can continue to monitor channel quality and scan sub-intervals 17909-2/3.

If a channel quality request is received (Y from 1790-4), a method 1790 can transmit channel quality data in an upload sub-interval 1790-5. Such actions can include receiving and transmitting packets in sub-intervals indicated during synchronization with the advertising link and/or according to a public or proprietary standard.

A method 1790 can determine if an updated channel map has been received 1790-6. Such an action can include scanning download sub-intervals. If an updated channel map is not received (N from 1790-6), a method 1790 can continue scanning sub-intervals. If an updated channel map is received (Y from 1790-6), a method 1790 can update a current channel map 1790-7.

In this way, a method can include monitoring a synchronized advertising link, and uploading channel quality data via the link in response to a request for channel data via the link.

Figure 18:
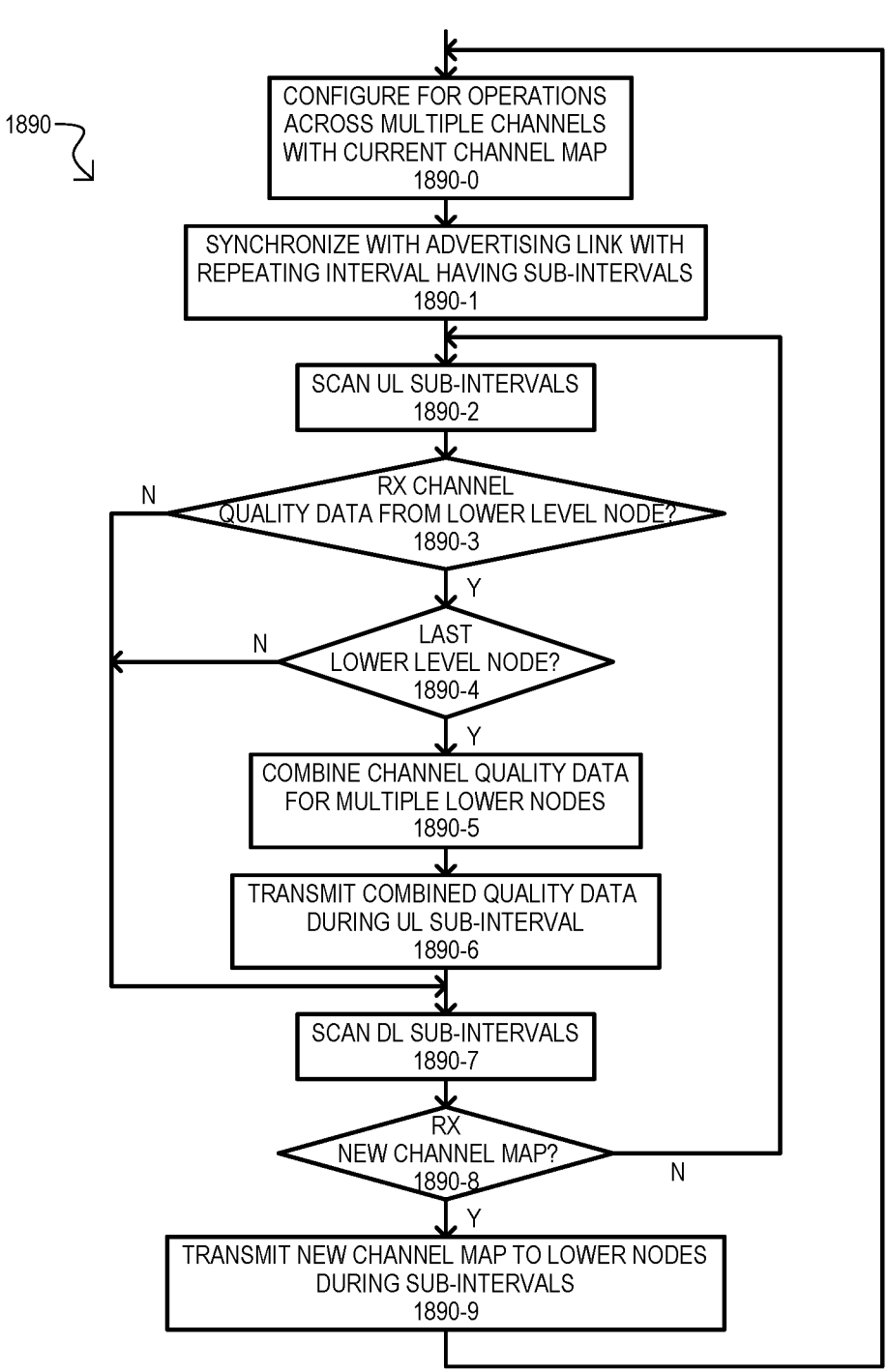
FIG. 18 is a flow diagram of a method according to another embodiment.

FIG. 18 is a flow diagram of a method 1890 according to another embodiment. A method 1890 can be executed by an intermediate device in a network to combine channel quality data from lower level devices and report such combined channel quality data up to a higher level device. A method 1890 can include configuring for operations across multiple channels with a current channel map 1890-0 and synchronizing with an advertising link having a repeating interval with sub-intervals 1890-1. Such actions can include any of those described herein or equivalents.

Once synchronized, a method 1890 can scan one or more upload sub-intervals 1890-2 of the advertising link. If a channel quality data from a lower level node is not received (N from 1890-3), a method 1890 can continue to scan one or more download sub-intervals 1890-7.

If a channel quality data from a lower level node is received (Y from 1890-3), a method 1890 can continue to scan receive channel quality data until data from a last lower level node has been received (N from 1890-4). Once channel quality data for all lower level devices has been received (or a time limit has been reached) (Y from 1890-4), a method 1890 can combine channel quality data from one or more lower level nodes 1890-5. Combined channel quality data can be transmitted during an upload sub-interval of the advertising link 1890-6.

Download sub-intervals can be scanned 1890-7. If a new channel map is not received (N from 1890-8), a method 1890 can continue to scan sub-intervals. If a new channel map is received (Y from 1890-8), a method 1890 can transmit new channel map to lower nodes during sub-intervals 1890-9.

In some embodiments, a link can be a BT advertising link. In a PADVB or PAwR type link. A parameter update packet can include an AUX_SYNC_IND PDU transmitted over the advertising link. Alternatively, in a PAwR-type link, a parameter update packet can include an AUX_SYNC_SUB-EVENT_IND PDU transmitted in a sub-event. In a PAwR type link, a scanning device (e.g., SR) can request a parameter update via an AUX_SYNC_SUBEVENT_IND PDU transmitted in an upload (e.g., response) sub-event and/or provide operating environment data in such a PDU. Further, in a PAwR type link, an operating environment or parameter request can be transmitted by an advertising device AUX_SYNC_SUBEVENT_IND PDU transmitted in a download (e.g., request) sub-event.

In this way, a method can include combine channel quality data from lower level devices of a hierarchy and report such data up to a device that is higher in the hierarchy.

While embodiments can include any suitable system in which multiple nodes can communicate via one or more advertising links, alternate embodiments can include additional functions.

Figure 19:
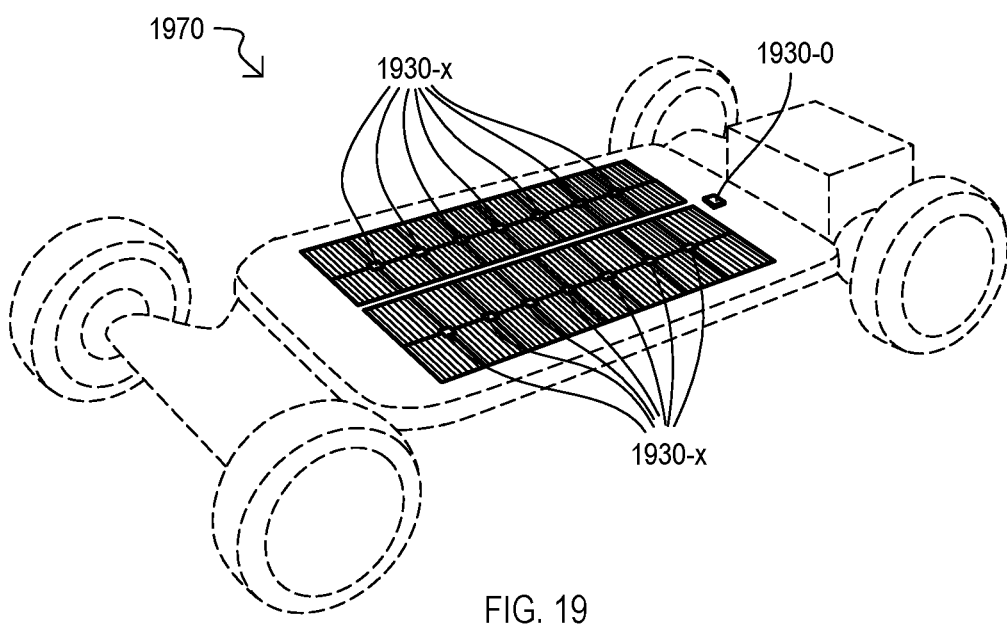
FIG. 19 is a diagram of a wireless battery management system according to an embodiment.

FIG. 19 is a diagram of a wireless battery management system (WBMS) 1970 according to an embodiment. A WBMS can include a management node 1930-0 and a plurality of monitor nodes 1930-x. Monitor nodes 1930-x can each be connected to one or more battery cells. A management node 1930-0 can be in wireless communication with monitor nodes 1930-x via one or more advertising links according to embodiments described herein or equivalents. A management node 1930-0 can serve as a broadcaster in the network.

According to embodiments, monitor nodes 1930-x can report channel quality data up to a management node 1930-0 as described herein and equivalents. Such an arrangement can enable a management node 1930-0 to assess radio conditions seen at each monitor node 1930-x. Further, monitor nodes 1930-x can include a multi-level hierarchy enabling channel quality to be combined (e.g., coalesced) for reporting up the hierarchy. This can enable a management mode 1930-0 to adjust a channel map and/or other network parameters in response. Further, changes can be made to communication parameters without having to re-establish the advertising link(s).

In some embodiments, a WBMS 1970 can be a BT PAwR-type system, have a multi-level topology consisting of two levels (L0-L1, & L1-L2). In one use case, if a L0 node reboots and starts to re-establish the L0 node PAwR train (e.g., interval with sub-events), the alignment of the L1 PAwR streams may not be conducive to L1 node timing. The L0 and L1 nodes can come into improved or ideal alignment by doing either of the following: the L0 node can query L1 node(s) for ideal placement of sub-events and update its own placement (e.g., timing of sub-events). L1 node(s) can automatically readjust their PAwR stream placement based on the L0 node PAwR stream timing. In another use case, for fast network establishment time, L1 node(s) can start their PAwR streams without waiting for the L0 node but can later re-align the PAwR streams to be in an improved or ideal alignment. In a third use case, L0, L1 and L2 nodes can switch to higher intervals to support deep sleep mode for saving power. In some embodiments, PAwR trains can change to a longer PADV interval.

In some embodiments, a WBMS 1970 can report up operating environment data, and then adjust communication, accordingly, as described herein. Such a feature can enable a WBMS 1970 to dynamically improve data reliability in the transmission of battery cell status and performance. Radio conditions can be assessed seen at each node. Operating environment data (e.g., interference reports) can be coalesced and reported up a topology to deliver an overall system assessment at a highest (e.g., root) node.

In this way, a WBMS can communicate via one or more advertising links that enable communication parameter data to be updated without re-establishing the link and/or the reporting of wireless operating environment data up to a controlling device.

Figure 20:
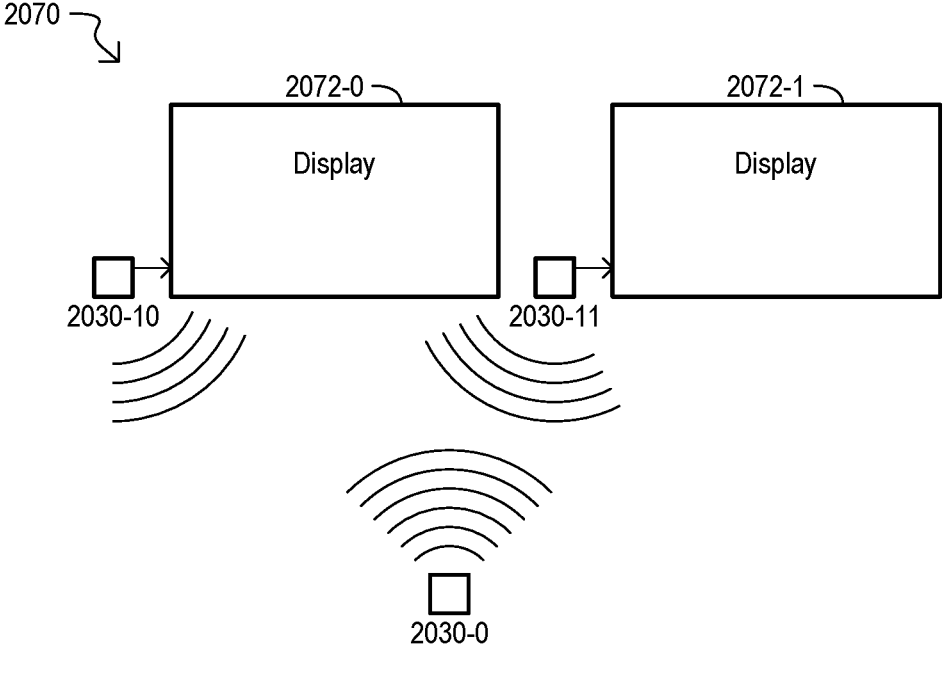
FIG. 20 is a diagram of a public announcement system according to an embodiment.

FIG. 20 is a diagram of a public announcement (PA) system 2070 according to an embodiment. A PA system 2070 can include a broadcaster 2030-0 in communication with SRs 2030-10/11 via an advertising link as described herein and equivalents. Broadcaster 2030-0 can provide data to SRs 2030-10/11 which can include displays 2072-0/1. Broadcaster 2030-0 can update properties of the advertising link without having to re-establish the link, as described herein or in an equivalent fashion.

In one embodiment, PA system 2070 can be a BT type system, a broadcaster 2030-0 can update text to display on displays 2072-0/1. A broadcaster 2030-0 can update intervals to different values without the overhead of re-establishing the link. Such an action can include broadcasting new interval information in a predetermined sub-event. In another embodiment, PA system 2070 can be a PAwR type system and SRs 2030-0/1 can update current PHY settings when they determine differences in range to a broadcaster 2030-0. An SR 2030-10/11 can determine that it is going out of range from a broadcaster 2030-0. Such an action can include any suitable method, including but not limited to: quality of communications and/or ranging methods (e.g., AoA or AoD). In response, an SR 2030-10/11 can request a PHY update as a current PHY may not achieve a desired range. Such an action can include an SR 2030-10/11 requesting a PHY update via a sub-event. Subsequently, a broadcaster 2030-0 can transmit updated PHY parameters via one or more sub-events.

In this way, a PA system can dynamically adjust advertising links as nodes move in and out of range.

Figure 21:
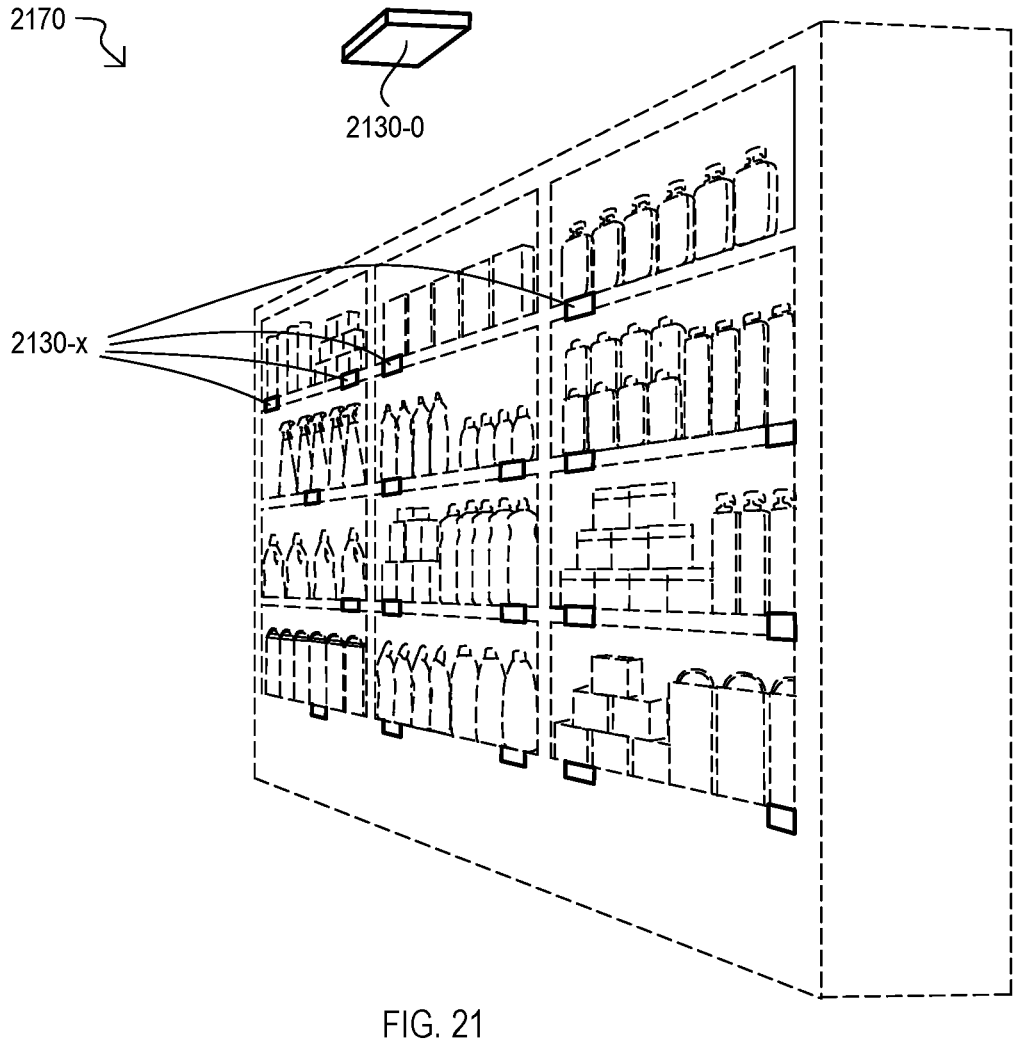
FIG. 21 is a diagram of an electronic shelf system according to an embodiment.

FIG. 21 is a diagram of an electronic shelf label (ESL) system 2170 according to an embodiment. A system 2170 can include a management node 2130-0 and a plurality of lower level nodes (four shown as 2130-x). In some embodiments, lower level nodes 2130-x can provide display information that can be periodically updated by communications from a management node 2130-0 via one or more periodic advertising links. Alternatively, nodes 2130-x can be stations that transmit data to electronic labels. An ESL system 2130 can update parameter data for advertising links as described herein or equivalents.

In some embodiments, an ESL system 2170 can be a BT PAwR-type system. Such an ESL system can include a large facility (e.g., warehouse) having a many (e.g., hundreds) of electronic labels 2130-*x* that operate as SRs for PAwR broadcasts. The same environment can have various WiFi (IEEE 802.11 wireless) access points in use at the same time. Further, workers can carry mobile phones that use both WiFi and Bluetooth. As a result, the radio environment can be very diverse and dynamic. The radio environment seen by one electronic label can be different from that of another electronics label. According to embodiments, electronic labels 2130-*x* can determine their local channel quality and report such data up to higher level nodes. A higher level nodes and/or a highest level node (e.g., 2130-0) can evaluate such channel quality information can derive one or more channel maps determined to be optimal for the local environment. In this way, PAwR broadcasts can be used to optimize a channel map that works well for most electronic labels. In addition or alternatively, multiple channel maps can be generated, with each channel map being optimized for a group of electronic labels.

In this way, an ESL system can include nodes or electronic labels that can report up wireless environment data via a periodic advertising link and then receive adjusted channel map data from the advertising link to optimize performance in the environment. Such changes in channel map can occur without re-establishing the advertising link.

Embodiments can include novel methods operating according to a BT standard that use PADVB and/or PAwR to update periodic advertising link parameters without re-configuring the link. Such a capability can provide reduced data loss for increased data reliability and/or availability. Power savings can be achieved due to reduced re-transmissions. There can be reduced delay for increased performance.

Embodiments are directed to methods, devices and systems that include, by operation of a wireless device configured to operate according to at least one wireless standard and according to current parameter data: monitoring at least a first advertising channel for an advertising indication packet; in response to advertising data in the advertising indication packet, synchronizing transmission and reception of packets to an advertising link that includes sub-intervals within a repeating interval; during a predetermined download sub-interval of the sub-intervals, receiving an update packet that includes new parameter data; during a predetermined upload sub-interval of the sub-intervals, transmitting an update response packet indicating the new parameter data has been received; configuring wireless operations of the wireless device according to the new parameter data; and continuing communications with the same advertising link while operating according to the new parameter data.

Embodiments are directed to methods, devices and systems that include wireless circuits configured to transmit and receive packets according to at least one wireless standard and current parameter data, clock circuits configured to maintain a time value with respect to at least one reference time value, and memory circuits configured to store at least the current parameter data. Controller circuits can also be included that are configured to: extract synchronization information from advertising packets transmitted on at least one advertising channel, according to the synchronization information and time value; synchronize transmission and reception of packets to sub-intervals within a repeating interval of an advertising link; determine when an update packet is received during a predetermined download sub-interval of the sub-intervals; in response to receiving the update packet, generate a response packet for transmission by the wireless circuits during an upload sub-interval of the sub-intervals; extract new parameter data from the update packet; update the current parameter data with the new parameter data; and continue communications with the same advertising link while operating according to the new parameter data.

Embodiments are directed to methods, devices and systems that include a scanning device configured to: transmit and receive packets according to at least one wireless standard and at least current parameter data; in response to synchronization data transmitted by an advertising device, synchronize transmission and reception of packets to sub-intervals within a repeating advertising interval of an advertising link; receive an update packet during a predetermined download sub-interval of the sub-intervals, the update packet including new parameter data; transmit a response packet during a predetermined upload sub-interval of the sub-intervals; update the current parameter data with the new parameter data; and continue communications with the same advertising link while operating according to the new parameter data.

Methods devices and systems according to embodiments can include new parameter data that are in a predetermined field of the update packet, the predetermined field designated for data transmitted from an advertising device.

Methods devices and systems according to embodiments can include, prior to receiving an update packet, transmitting an update request packet during an upload sub-interval, the update request packet including data indicating a request for parameter data to the advertising device.

Methods devices and systems according to embodiments can include, by operation of an advertising device, repeating a transmission of the update packet over multiple download sub-intervals of the same interval.

Methods devices and systems according to embodiments can include, by operation of an advertising device, prior to transmitting an update packet, transmitting a parameter request packet in at least one download sub-interval, receiving a parameter packet from a plurality of devices, including from the wireless device, during a plurality of upload sub-intervals, each parameter packet including current parameter data for the corresponding device, and generating the new parameter data from the received current parameter data.

Methods devices and systems according to embodiments can include, new parameter data being selected from the group of: timing information for the interval; timing information for the sub-intervals; a type of wireless physical connection for wireless transmissions of the method; packet error correction or detection data; a timing value for synchronizing to the interval, a timing value for synchronizing to the sub-intervals and authentication data.

Methods devices and systems according to embodiments can include a wireless device being configurable to transmit over a plurality of channels. By operation of the wireless device, prior to receiving the update packet, a channel quality packet can be transmitted during an upload sub-interval. The channel quality packet can include quality data for the channels. Current parameter data can include a current channel map that is updated with new parameter data that includes a new channel map. Current and new channel maps can indicate at least which channels are excluded for use in transmissions.

Methods devices and systems according to embodiments can include a plurality of scanning devices. Sub-intervals can include a plurality of upload sub-intervals, each of the plurality of upload sub-intervals being assigned to a different scanning device. Each scanning device can transmit a channel quality packet during the assigned upload sub-interval.

Methods devices and systems according to embodiments can include, by operation of a wireless device, receiving report packets from a plurality of lower-level wireless devices during upload sub-intervals. The report packets can include operating environment data for the corresponding lower-level wireless device. Combined reporting data can be generated from the operating environment data for a plurality of lower-level wireless devices. A combined reporting packet can be transmitted during an upload sub-interval that includes the combined reporting data.

Methods devices and systems according to embodiments can include devices operating according to at least one BT standard, and operating environment data can include quality data for BT channels.

Methods devices and systems according to embodiments can include a device with memory circuits configured to store instructions and controller circuits that include processor circuits executing the instructions.

Methods devices and systems according to embodiments can include controller circuits configured to, prior to receiving the update packet, generate data for a parameter request packet that indicates a request for new parameter data. Wireless circuits can be configured to, prior to receiving the update packet, transmit the parameter request packet during a predetermined upload sub-interval of the sub-intervals.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
by operation of a wireless device configured to operate according to at least one wireless standard and according to current parameter data:
monitoring at least a first advertising channel for an advertising indication packet;
in response to advertising data in the advertising indication packet, synchronizing transmission and reception of packets to an advertising link that includes sub-intervals within a repeating interval on a second advertising channel;
during a predetermined download sub-interval of the sub-intervals, receiving an update packet that includes new parameter data from an advertising device;
during a predetermined upload sub-interval of the sub-intervals, transmitting an update response packet indicating the new parameter data has been received;
during upload sub-intervals, receiving report packets from a plurality of lower-level wireless devices, the report packets including operating environment data for the corresponding lower-level wireless device;
generating combined reporting data from the operating environment data for the plurality of lower-level wireless devices; and
transmitting a combined reporting packet during an upload sub-interval that includes the combined reporting data;
configuring wireless operations of the wireless device according to the new parameter data; and
continuing communications with the same advertising link while operating according to the new parameter data.

2. The method of claim 1, wherein the new parameter data are in a predetermined field of the update packet, the predetermined field designated for data transmitted from the advertising device.

3. The method of claim 1, further including, prior to receiving the update packet, transmitting an update request packet during an upload sub-interval, the update request packet including data indicating a request for parameter data for the wireless device.

4. The method of claim 1, further including, by operation of an advertising device, repeating a transmission of the update packet over multiple download sub-intervals of the same interval.

5. The method of claim 1, further including:
by operation of an advertising device, prior to transmitting the update packet,
transmitting a parameter request packet in at least one download sub-interval,
receiving a parameter packet from a plurality of devices during a plurality of upload sub-intervals, each parameter packet including current parameter data for the corresponding device, and
generating the new parameter data from the received current parameter data.

6. The method of claim 1, wherein the new parameter data are selected from the group of: timing information for the interval; timing information for the sub-intervals; a type of wireless physical connection for wireless transmissions of the method; packet error correction or detection data; a timing value for synchronizing to the interval, a timing value for synchronizing to the sub-intervals and authentication data.

7. The method of claim 1, further including:
the wireless device is configurable to transmit over a plurality of channels; and
by operation of the wireless device, prior to receiving the update packet, transmitting a channel quality packet during an upload sub-interval, the channel quality packet including quality data for the channels; wherein the current parameter data comprises a current channel map, the new parameter data comprises a new channel map, and the current and new channel maps indicate at least which channels are excluded for use in transmissions.

8. The method of claim 7, further including:

the wireless device is one of a plurality of scanning devices;

the sub-intervals include a plurality of upload sub-intervals, each of the plurality of upload sub-intervals being assigned to a different scanning device; and each scanning device transmits a channel quality packet during the assigned upload sub-interval.

9. The method of claim 1, wherein:

the least one wireless standard is at least one Bluetooth (BT) standard, including Bluetooth Low Energy; and the operating environment data comprises quality data for the BT channels.

10. A device, comprising:

wireless circuits configured to transmit and receive packets according to at least one wireless standard and current parameter data;

clock circuits configured to maintain a time value with respect to at least one reference time value; and memory circuits configured to store at least the current parameter data;

controller circuits configured to extract synchronization information from advertising packets transmitted on at least one advertising channel from an advertising device, according to the synchronization information and time value, synchronize transmission and reception of packets to sub-intervals within a repeating interval of an advertising link, determine when an update packet is received during a predetermined download sub-interval of the sub-intervals, in response to receiving the update packet, generate a response packet for transmission by the wireless circuits during an upload sub-interval of the sub-intervals, extract new parameter data from the update packet, update the current parameter data with the new parameter data, continue communications with the same advertising link while operating according to the new parameter data; wherein the at least one wireless standard transmits packets on a plurality of different channels;

the wireless circuits are configured to receive reporting packets from lower level devices during upload sub-intervals of the sub-intervals, the reporting packets including quality data of the channels with as determined by the lower level device; and the controller circuits are further configured to generate combined quality data from a plurality of lower level devices for transmission in a reporting packet during an upload sub-interval of the sub-intervals.

11. The device of claim 10, wherein the wireless circuits are compatible with at least one Bluetooth (BT) standard, including Bluetooth Low Energy.

12. The device of claim 10, wherein:

the memory circuits are further configured to store instructions; and the controller circuits comprise processor circuits executing the instructions.

13. The device of claim 10, wherein:

the controller circuits are further configured to, prior to receiving the update packet, generate data for a parameter request packet that indicates a request for new parameter data; and the wireless circuits are configured to, prior to receiving the update packet, transmit the parameter request packet during a predetermined upload sub-interval of the sub-intervals.

14. The device of claim 10, wherein the new parameter data are selected from the group of: timing information for the interval; timing information for the sub-intervals; a type of wireless physical connection for wireless transmissions; packet error correction or detection data; a timing value for synchronizing to the interval, a timing value for synchronizing to the sub-intervals; and authentication data.

15. The device of claim 10, wherein:

the at least one wireless standard transmits packets on a plurality of different channels;

the controller circuits are further configured to generate quality data for the different channels; and the wireless circuits are configured to, prior to receiving the update packet, transmit a channel quality packet during an upload sub-interval of the sub-intervals.

16. A system, comprising:

a scanning device configured to transmit and receive packets according to at least one wireless standard and at least current parameter data;

in response to synchronization data transmitted by an advertising device, synchronize transmission and reception of packets to sub-intervals within a repeating advertising interval of an advertising link;

receive an update packet during a predetermined download sub-interval of the sub-intervals, the update packet including new parameter data;

transmit a response packet during a predetermined upload sub-interval of the sub-intervals;

update the current parameter data with the new parameter data; and continue communications with the advertising link while operating according to the new parameter data; wherein the at least one wireless standard transmits packets over a plurality of different channels; and the scanning device is further configured to receive channel quality packets from a plurality of lower-level scanning devices, each channel quality packet including quality data for the channels with respect to the corresponding lower-level scanning device, generate combined quality data from the received quality data, and transmit a reporting packet that includes the combined quality data during an upload sub-interval of the sub-intervals.

17. The system of claim 16, further including:

the scanning device is configured to transmit an update request packet prior to receiving the update packet during an upload sub-interval of the sub-intervals; and the advertising device is configured to transmit the update packet in response to receiving at least the update request packet.

18. The system of claim 16, further including:

the at least one wireless standard transmits packets over a plurality of different channels;

the scanning device is configured to transmit a channel quality packet during an upload sub-interval of the sub-intervals, the channel quality packet including data indicating a quality of each channel with respect to the scanning device; and the advertising device is configured to transmit the update packet in response to receiving at least the channel quality packet, the update packet including channel map data indicating at least which channels are excluded from transmission.

19. The system of claim 16, wherein the at least one wireless standard includes at least a Bluetooth standard including Bluetooth Low Energy.

* * * * *